United States Patent [19]

Durst, Jr. et al.

[11] Patent Number: 4,800,504

[45] Date of Patent: Jan. 24, 1989

[54] INTERACTIVE OUTGOING AND INCOMING MAILPIECE PROCESSING SYSTEM

[75] Inventors: Robert T. Durst, Jr., Monroe; Alfred C. Schmidt, Wilton, both of Conn.

[73] Assignee: Pitney Bowes Inc., Stamford, Conn.

[21] Appl. No.: 25,552

[22] Filed: Mar. 13, 1987

[51] Int. Cl.⁴ ........................ G06F 15/20; B65H 39/02

[52] U.S. Cl. .................................... 364/478; 235/375; 270/58; 364/464.02

[58] Field of Search ........................ 364/478, 464, 466; 235/375, 432; 209/900, 569, 583, 584, 3.1-3.3; 270/4, 58; 101/2

[56] References Cited

U.S. PATENT DOCUMENTS

| | | | |
|---|---|---|---|
| 3,895,220 | 7/1975 | Nelson et al. | 209/3.3 X |
| 4,024,380 | 5/1977 | Gunn | 209/900 X |
| 4,384,196 | 5/1983 | McCumber et al. | 270/58 X |
| 4,582,312 | 4/1986 | Abrams et al. | 270/58 X |
| 4,585,220 | 4/1986 | Zemke et al. | 270/58 X |
| 4,639,873 | 1/1987 | Baggarly et al. | 364/478 X |

*Primary Examiner*—Joseph Ruggiero

*Attorney, Agent, or Firm*—Donald P. Walker; David E. Pitchenik; Melvin J. Scolnick

[57] ABSTRACT

An interactive outgoing and incoming mailpiece processing system is provided. The system includes structure for processing an outgoing mailpiece for mailing to an addressee. The outgoing mailpiece includes a returnable stationery item bearing an identification code identifying the addressee. The system additionally includes a computer. The computer includes a memory device for storing the identification code. The computer also includes a dispositive data listing for the identification code. The listing includes data corresponding to an operation to be implemented by the system, and is programmed for causing the system to implement the operation upon sensing the identification code for the listing. The system also includes structure for processing an incoming mailpiece, including the stationery item when it is returned. In addition, the system includes code sensing structure and structure for changing the dispositive data listing, whereby the data corresponding to the operation may be changed.

22 Claims, 12 Drawing Sheets

INTERACTIVE OUTGOING AND INCOMING MAILPIECE PROCESSING SYSTEM

BACKGROUND OF THE INVENTION

This invention is generally concerned with apparatus for processing letters and more particularly with a modularly constructed, computer controlled, interactive outgoing and incoming mail processing system.

The manner in which large business letter mailers prepare and process various types of outgoing business mail has changed in recent years from a predominantly labor intensive activity to one that is primarily handled by computer controlled, automated, paper handling equipment. Thus it is a common practice for large business letter mailers, such as telephone companies, mass merchandisers and private mailers, to employ computer controlled inserters for enclosing monthly bills, remittance slips, return envelopes, questionnaires, purchase order forms and other returnable stationery items in address-window type outer envelopes, and automatically sealing the outer envelopes. The sealed envelopes are then fed to a postage meter, for printing thereon a predetermined postage value, and stacked for delivery to the Postal Service. In some instances; prior to being stacked for delivery, the metered mailpieces may be loaded into other mechanized equipment, for example, for sorting in accordance with their destination zip codes or for tying into bundles, or both. In other instances, the metered mailpieces may be loaded into a keyboard operated printer, for adding to each mailpiece a bar code corresponding to the destination zip code in response to keyboard input from an operator. The postage paid, zip and/or bar coded mailpieces, which may also be pre-sorted, are then delivered to the Postal Service.

Assuming a bar code is not provided, upon arrival at the Post Office, the zip code and address supplied by the business letter mailer, are used by the Postal Service for sortation purposes. To that end, the mailpieces are loaded into automated processing apparatus for singulating the mailpieces, and, under the control of a computer, the address and/or zip code information is read from each mailpiece, and translated to a corresponding destination bar code, which is printed on the mailpiece. Thereafter the mailpieces are sorted in accordance with destination information from the computer. Assuming a given mailpiece is already provided with a destination bar code, the same computer controlled equipment, in a different mode of operation, or other automated equipment, is utilized for reading bar codes and sorting the mailpieces based thereon. In general, the Postal Service automatically processes the mail in at least one major Post Office or Distribution Center before the final sortation at the local level. Accordingly, it is a common practice to process a given mailpiece through several sortations for delivery to destinations that are identified by human and machine readable languages. Whereupon, the mailpieces are hand delivered to the addressees, who respond by delivering mailpieces including one or more of the aforesaid returnable stationery items to the Postal Service for processing and delivery to the business mailer.

Some business letter mailers provide a sort code on return envelopes mailed to their customers together with a bill, so that when such envelopes are returned with a payment, they may be scanned for the code, automatically sorted to a sortation location corresponding to the code and thus separated from differently coded and uncoded envelopes by the business mailer. Whereupon the envelopes are hand delivered to the business unit corresponding to the code. At this juncture, the mailpieces may or may not be fed to an automatic letter opening machine, depending upon the volume of mailpieces received by the particular business unit. If for any reason the location of the business unit has changed while the return envelope was in transit, the mailpiece may or may not be delivered directly to the business unit. As often as not, the mailpiece is routed to the old location of the business unit, where the initial recipient may or may not properly route the mailpiece, or do so and fail to inform the mail handling personnel of a change of the location, with the result that they do not institute procedures for the proper delivery of subsequently received mailpieces.

In addition to the foregoing problems, in order to expedite payment of large outstanding bills and thereby reduce the customer "float", some large business letter mailers have instituted special procedures for marking selected return envelopes, included with the mail sent to a particular customer, with a machine readable code which allows such envelopes, when returned, to be sorted from the main stream of incoming return envelopes and handled on an expedited basis. That business letter mailers should have to resort to such procedures clearly emphasizes the inadequacies of their normal mail processing procedures.

Other segments of the business community experience mail processing delays that may have an adverse effect on the reputation of the business mailer. For example, mail order businesses time and again find that a particular product that has been ordered by filling in a pre-coded advertisement is not in stock, but fail to timely notify the customers that the product has been back-ordered and provide a prospective date of delivery. Similarly, insurance companies oftentimes find that additional information is needed from a medical services provider concerning a particular claim, but fail to timely notify the claimant that claim payment will be delayed pending the receipt of the additional information requested from the medical services provider.

The foregoing problems and other difficulties stem from the fact that business letter mailers must classify return mail prior to mailing the same to their customers. The code marked on the return envelope or other return stationery items is the only source of information available for mail processing personnel, or code reading and sorting equipment, to refer to for determining where the return item is to be delivered. However, the business letter mailer may not know the basis for sorting a given return item at the time it is mailed; or know the return destination, but be unaware hat the sorting criteria will change while the return item is in transit from the mailer to the customer and back to the mailer; or know the return destination and other information needed for sorting, but find that the other information is not within the scope of the code recognition capability of the incoming mail sorter, for example, instructions to inform a different addressee that a particular incoming return envelope has been received in order to avoid the expense entailed in double billing.

Accordingly:

An object of the invention is to provide improvements in letter processing apparatus;

Another object is to provide outgoing coded stationery item processing apparatus, which includes printing means and means for feeding the stationery item to the printing means, with structure for feeding the stationery item out of the path of travel to the printing means when the code is sensed;

Another object is to provide an interactive outgoing and incoming letter processing system;

A further object is to provide incoming mail processing system including provision for sorting incoming mailpieces, on the basis of sorting criteria established while the mail was in transit to the addressee thereof or thereafter; and, Another object is to provide a modularly constructed, interactive outgoing and incoming mail processing system including structure for processing return stationery items in consideration of different codes.

SUMMARY OF THE INVENTION

An interactive outgoing and incoming mailpiece processing system comprising: means for processing an outgoing mailpiece for mailing to an addressee, said outgoing mailpiece including a returnable stationery item bearing an identification code identifying the addressee thereof; computer means, said computer means including means for storing said identification code, said computer means including a dispositive data listing for said identification code, said listing including data corresponding to an operation to be implemented by said system, said computer means including means for causing said system to implement said operation upon sensing the identification code for said listing; means for processing an incoming mailpiece, said incoming mailpiece including said stationery item when returned; means for sensing said code; and means for changing the dispositive data listing whereby said data corresponding to said operation may be changed.

BRIEF DESCRIPTION OF THE DRAWINGS

As shown in the drawings, wherein like reference numerals designate like or corresponding parts throughout the several views:

FIG. 1(*b*) is a front view of another return stationery item, prepared for enclosure in a mailing envelope, showing a return code located in more than one exemplary position;

FIG. 1(*c*) is a front view of a foldable return stationery item, prepared for enclosure in a mailing envelope, showing a return code located in a different exemplary position;

FIG. 1(*d*) is a front view of a return stationery item, prepared for enclosure with a return envelope having a see-through window, showing different return and customer account codes;

FIG. 1(*e*) is a front view of a coded, see-through type, mailing envelope into which the return stationery items shown in FIGS. 1(*b*), 1(*c*) or 1(*d*) alone or in combination with one of the return envelopes shown in FIGS. 1(*a*) or 1(*f*), may be inserted for mailing;

FIG. 1(*f*) is a front view of a coded see-through type, return envelope.

FIG. 2(*b*) is a schematic view showing a part of the stationery items processing apparatus according to the invention, including the inserting and letter opening modules and the remote computer;

FIG. 2(*c*) is a schematic view showing a part of the stationery items processing apparatus according to the invention, including the postage metering, stacking, sorting and other processing modules;

FIG. 4(*b*) is a flow chart showing the processing steps implemented by the local computer of FIG. 2(*a*) for controlling the inserting and postage metering modules of the processing apparatus of FIGS. 2(*b*) and 2(*c*), respectively;

FIG. 4(*c*) is a flow chart showing the processing steps implemented by the local computer of FIG. 2(*a*) for controlling the stacking and other processing modules of FIG. 2(*c*);

FIG. 4(*d*) is a flow chart showing the processing steps implemented by the local computer of FIG. 2(*a*) for controlling the sorting and letter opening modules of FIG. 2(*c*) and 2(*b*), respectively.

DESCRIPTION OF THE PREFERRED EMBODIMENTS

Figure 1A:
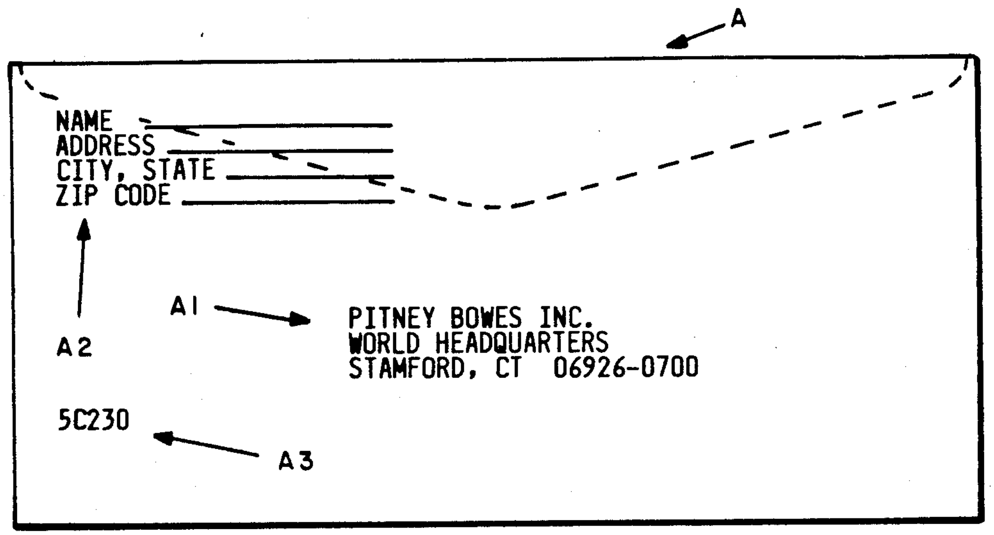
FIG. 1(*a*) is a front view of a return envelope prepared for enclosure in a mailing envelope, showing a return code located in an exemplary position.
Figure 1B:
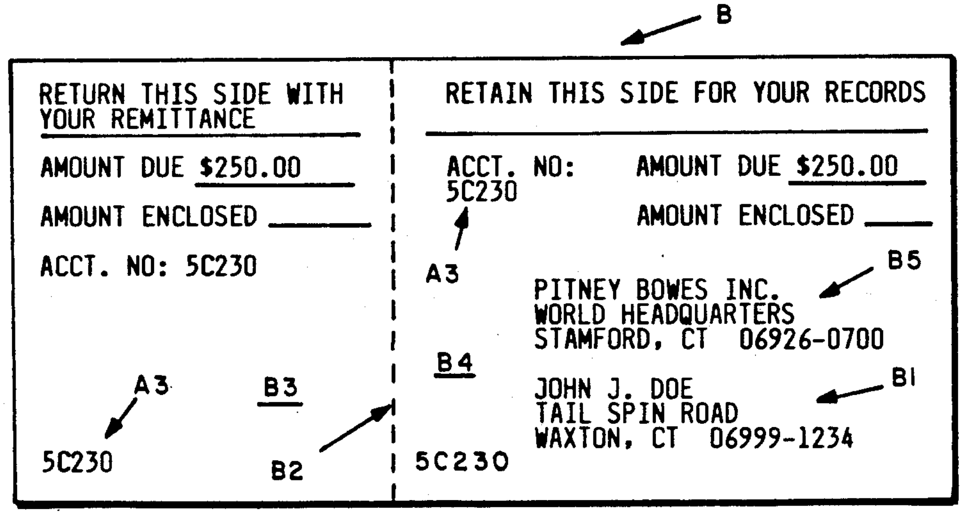
Figure 1C:
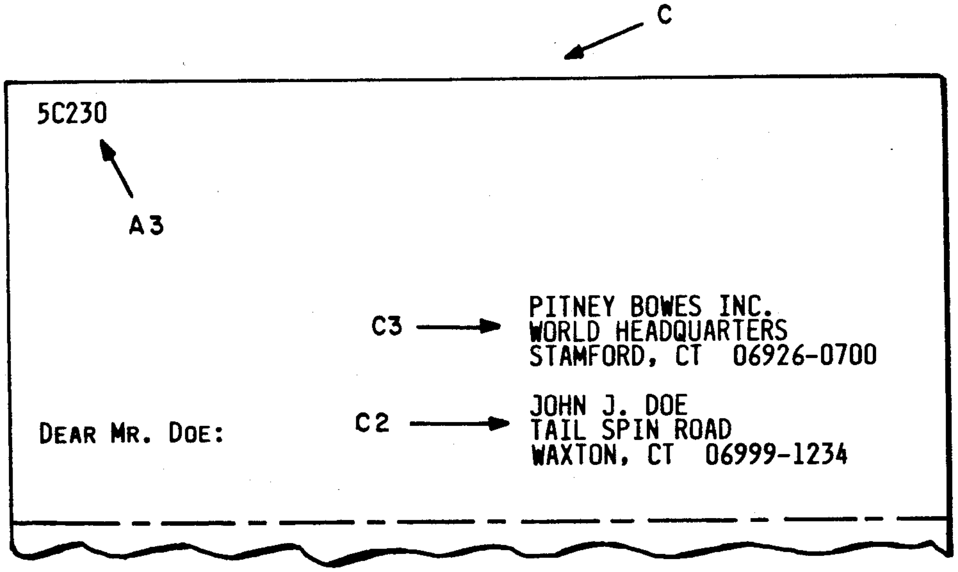
Figure 1D:
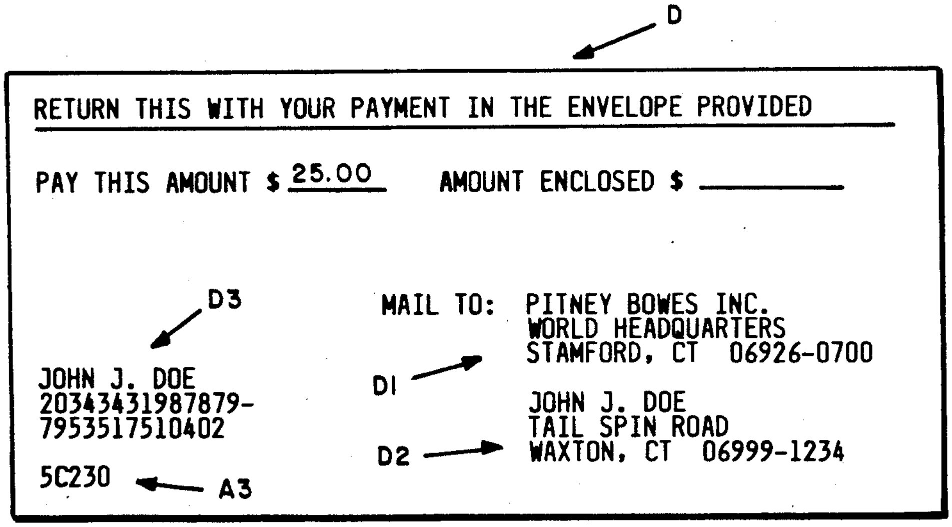
Figure 1E:
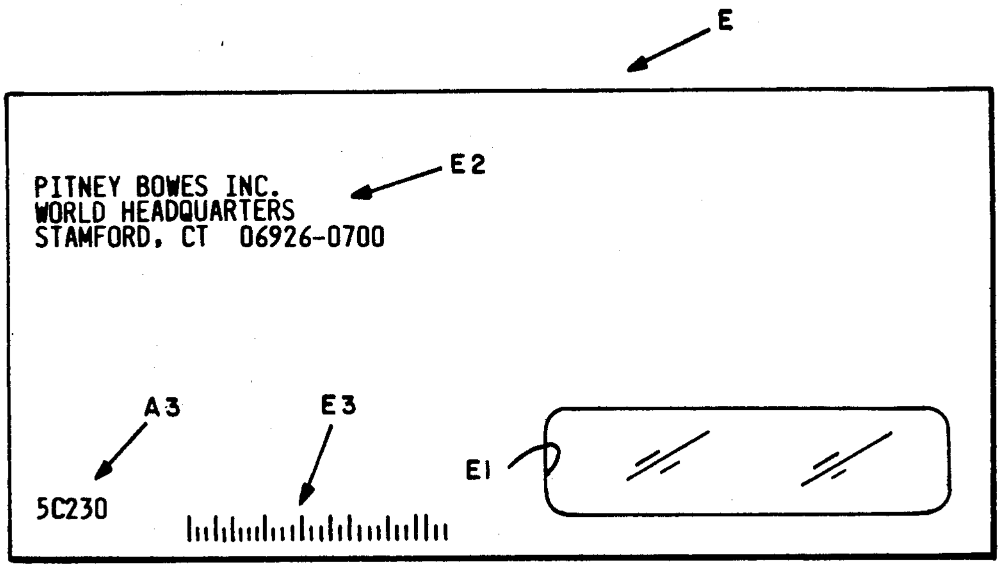
Figure 1F:
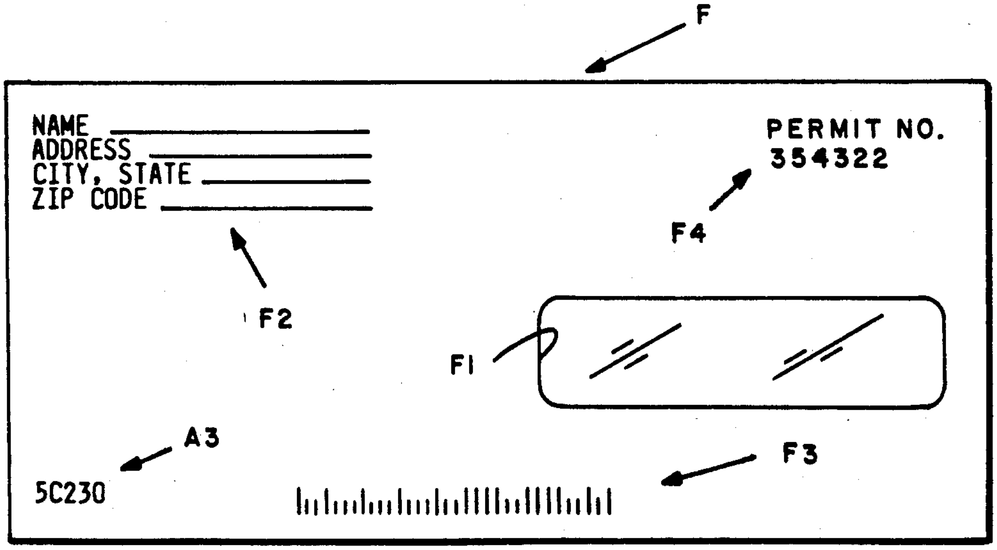

FIGS. 1(*a*)–1(*f*) inclusive show examples of various documents of the type which may be processed in accordance with the invention. FIG. 1(*a*) portrays a typical return stationery item, exemplified by the envelope A. The envelope A includes a mailing address A1 of a typical business mailer to whom the envelope A is to be mailed. For the sake of convenience, the mailer's address A1 has been chosen to be that of the assignee of the present invention. In addition, the envelope A includes a return address area A2 for filling in by the person, or firm, company, corporation or other business entity to whom the return envelope A was sent by the mailer and from whom the return envelope A is ordinarily received In the lower left hand corner of the envelope A, an alphanumeric return code A3 has been added to the envelope in the course of printing the same. According to the invention, the code A3 as shown, i.e. 5C230, was randomly chosen to be representative of any return code assigned by the mailer, and, without departing from the spirit and scope of the invention, may be a bar code. Further the code A3 may be located in any predetermined location on the stationery item without departing from the spirit and scope of the invention. Preferably the code A3 uniquely identifies the sender of the return envelope A, although it is within the scope of the invention to provide the same return code for a plurality of envelopes for sortation purposes. Thus, rather than the code A3 as shown, the sender's social security number, or other tax identification code in the case of a business entity, could have been shown as the code A3, or, if such numbers are not used, a bar code or other customer account code, such as the recipient's telephone number, could be used.

FIG. 1(*b*) portrays another return stationery item, in this instance exemplified by the remittance slip B. The remittance slip B includes the address of its recipient B1, located in the lower right hand quadrant of the slip B for exposure through the window of a window-type envelope into which the slip B may be inserted for sending to the recipient B1. In addition, the return stationery item B includes a perforation line B2 along which the slip B, may be folded to facilitate separation of the slip into returnable and retainable parts, numbered B3 and B4 respectively, in accordance with the notation near the top of each of the stationery item's parts B3 and B4. In this instance, the return code A3 is marked on both parts B3 and B4, inasmuch as recipients B1 oftentimes return the wrong part, in this case B4, to the mailer B5.

FIG. 1(*c*) shows another return stationery item, in this instance a foldable return item C, such as a letter or computer print out sheet. The return item C includes a recipient's address C2 and mailer's address C3 located in the lower right hand and upper left hand quadrants, respectively, of the return item C. The return item C is thus designed to be sent by the mailer C3 to the recipient C2 in a window-type mailing envelope, having the window located in the lower right hand quadrant, together with window-type return envelope having the window located in the upper right hand quadrant. In addition, the foldable return item C includes a return code A3, which is shown located near the upper left hand corner of the return item, in order to exemplify the fact that it does not matter, in the context of the present invention, where the return code A3 is located on any return item as long as a standard location is adopted for code scanning purposes.

FIG. 1(*d*) shows another return stationery item, in this case a different type of remittance slip D. The return slip D includes the mailer's and recipient's addresses, numbered D1 and D2 respectively, in the upper and lower right hand quadrants for the reasons stated above in the discussion of FIG. 1(*c*). The slip D also shows a customer account number D3 which differs from the return code A3. According to the invention the code A3 and account number D3 be may be different from one another, although as a convenience they may be the same as shown in FIG. 1(*b*). In some instances the capacity of a system which processes return stationery items may not have the capability of recognizing an account number such as the number D3 shown for illustrative purposes, as a result of which a part of that number or the different number A3 may be used as the return code A3.

In FIG. 1(*e*), there is shown a window-type mailing envelope E, having a window E1 located in the lower right hand quadrant, whereas in FIG. 1(*f*) there is shown a window-type mailing envelope F having a window F1 located in the upper right hand quadrant. The envelope E includes the mailer's address E2, whereas the envelope F includes an area F2 to be filled in by the recipient. Thus the envelope E exemplifies a window-type mailer's envelope, which is marked with a code A3 in accordance with the invention, whereas the envelope F exemplifies a window-type return stationery item including the code A3. As shown in FIG. 1(*e*), in order to reduce the cost of postage for mailing, some mailers mark outgoing mailpieces with a standard bar code notation E3, referred to by skilled artisans as a bar-half-bar code, which is used by the U.S. Postal Service for bar code sortation purposes, and to pre-sort such mailpieces before delivery to the Postal Service. Preferably, the return envelope F is also marked with a postal bar code F3, in this instance the businesses mailer's, to facilitate rapid processing by the Postal Service. In addition, the envelope F may be marked with a permit mail serial number F4 in the upper right hand quadrant for providing postage paid return envelopes to customers of the business mailer.

With the above thoughts in mind, it is evident that the return envelope A together with the return stationery item B may be enclosed by a business mailer in the envelope E, such that the recipient's address B1 is exposed through the window E1. Or, the return item C may be enclosed with the return envelope F, in the mailing envelope E, such that the address C2 is exposed through the window E1 when mailed, whereby when the return envelope F is returned by the recipient C2, the return item C may be enclosed in the envelope F such that the address C3 is exposed through the window F1. Other combinations, sizes and shapes of envelopes A, E, F and other stationery items B, C and D, may of course be used by persons skilled in the art without departing from the spirit and scope of the invention, including for example envelopes E and F that are not window-type envelopes.

Figure 2A:
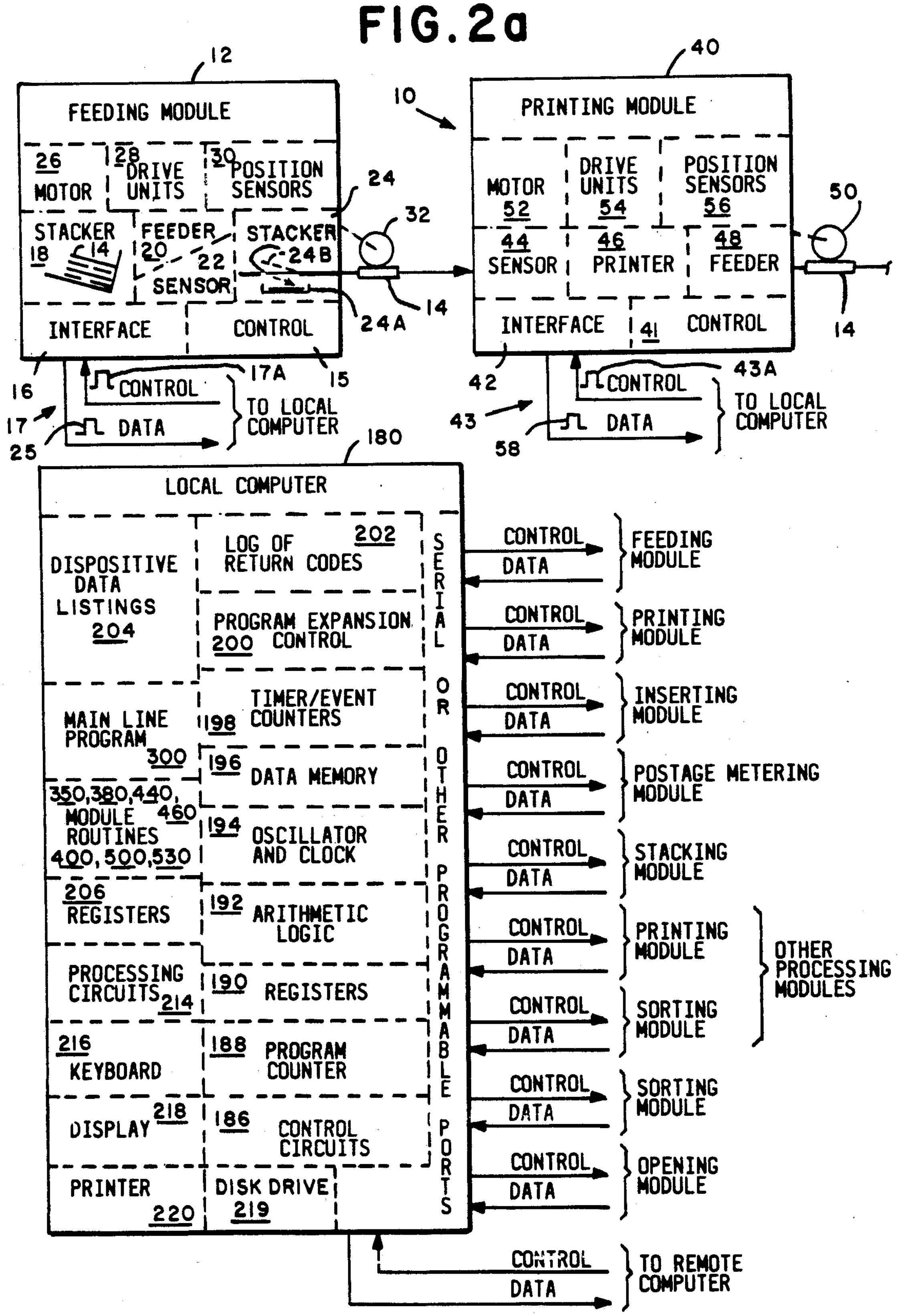
FIG. 2(*a*) is a schematic view showing a part of the stationery items processing apparatus according to the invention, including the feeding and printing modules and the local computer.
Figure 2B:
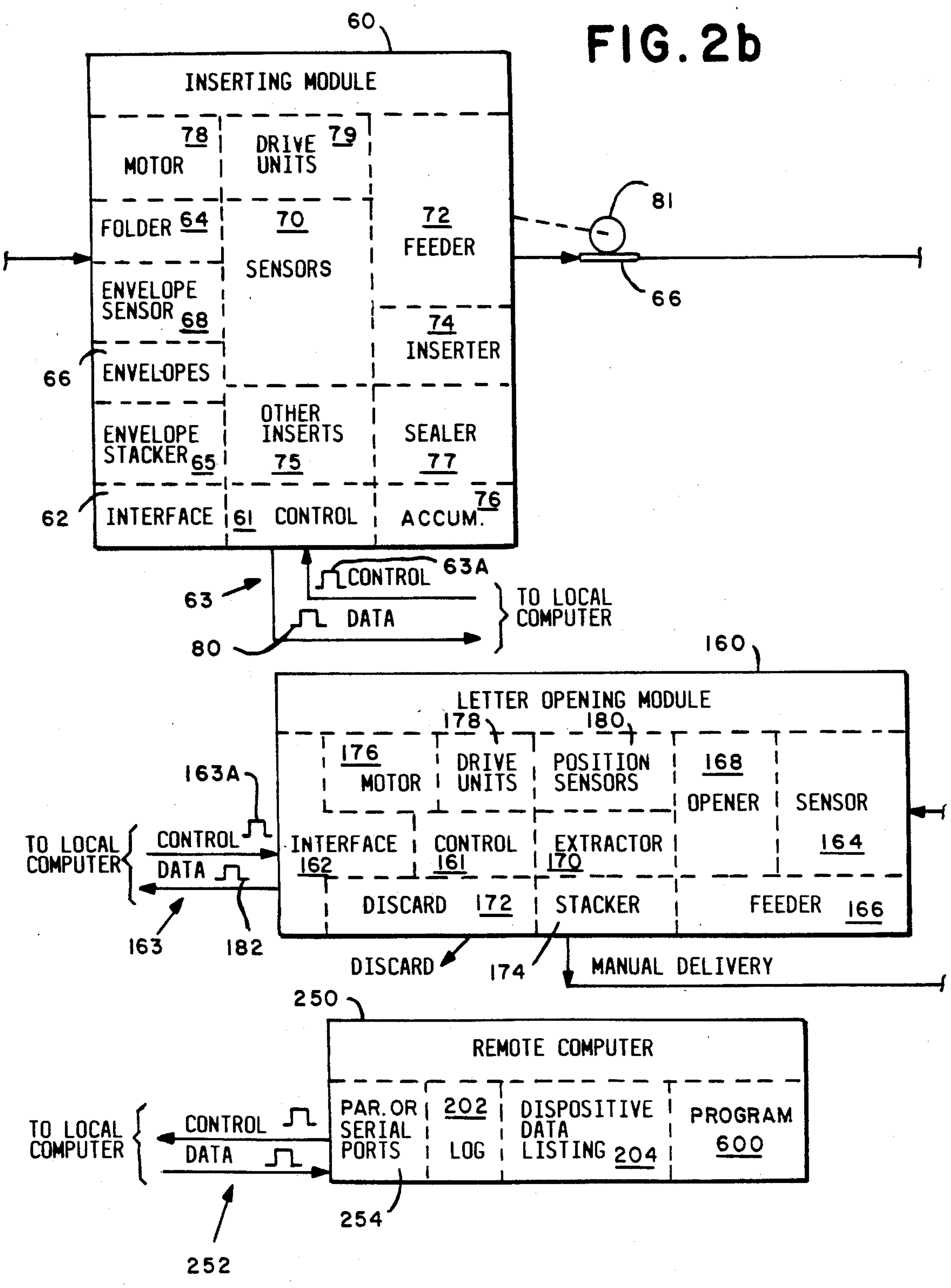
Figure 2C:
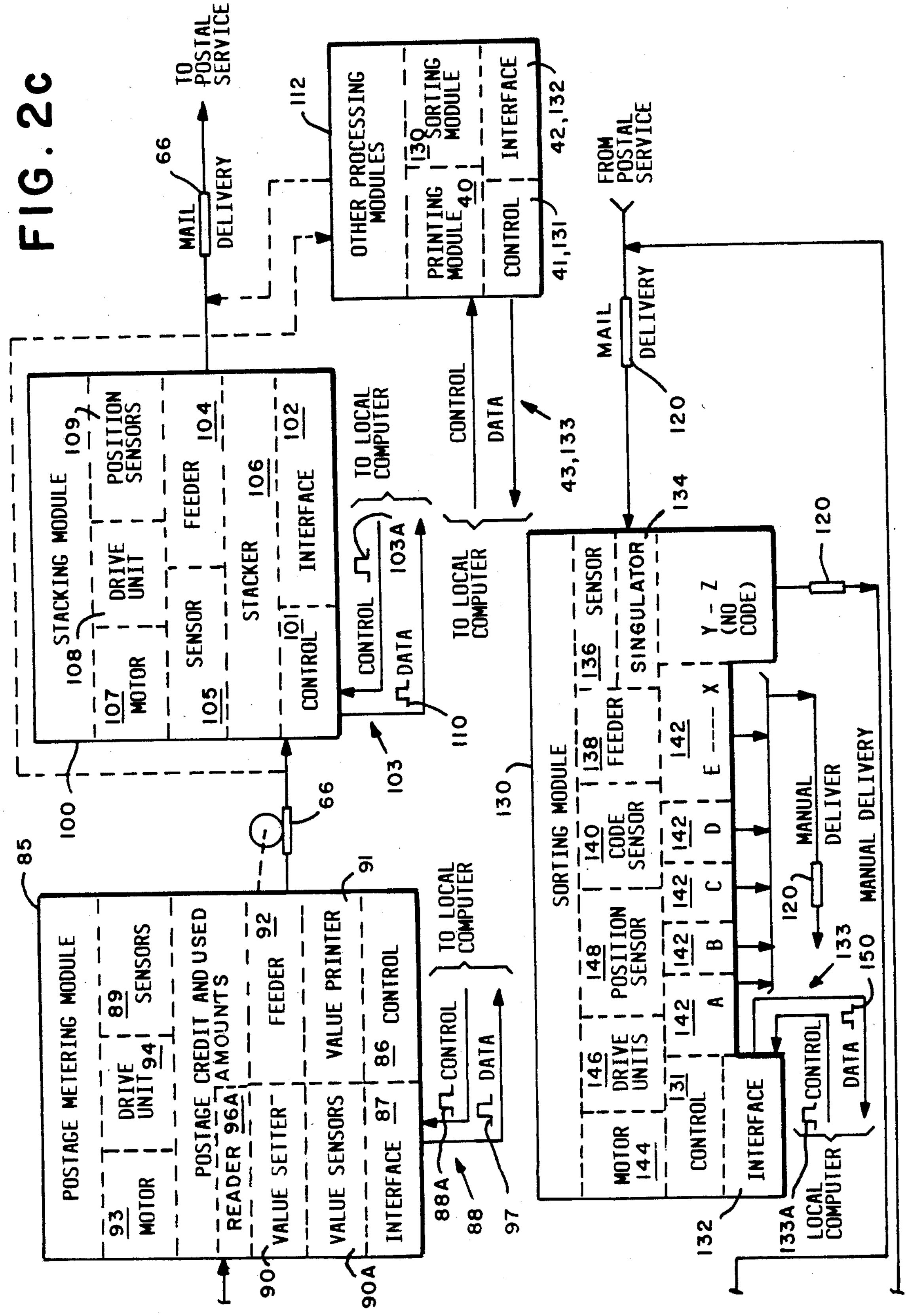

As shown in FIG. 2(*a*), a system 10 of the type which may be used for processing the above described stationery items A–D may include a conventional sheet feeding module 12 into which a plurality of such stationery items, hereinafter numbered 14, may be loaded for feeding purposes. A typical stationery item 14 may include a code A3, which is printed on the item 14 in a predetermined location prior in time to being processed by the apparatus 10, or the apparatus 10 may be utilized for printing the code A3 on the stationery item 14. Assuming the stationery item 14 includes a code A3 the feeding module 12 may be included in the apparatus 10, in order to provide for sensing the code A3 to establish that a document 14 bearing a particular return code A3 is in the process of being prepared for mailing.

The feeding module 12 (FIG. 2(*a*)) is preferably a conventional stand alone device which includes suitable control structure 15, such as a microprocessor, for controlling the various structures and functions of the module 12. In addition, the module 12 includes a conventional operator interface 16, including a keyboard, which is conventionally coupled to the control structure 15 for operation thereof in response to input signals from the operator interface 16. The control structure 15 is also conventionally adapted to include a two-way serial or parallel communication link 17 for conventionally coupling the control structure 15 to an external source, such as the local computer hereinafter described, for operation of the control structure 15 in response to control signals, such as the signal 17A, received from the external source. Thus, the module 12 is adapted to permit control of the structures and functions of the modules 12 from an external source rather than from the operator interface 16. The module 12 additionally includes conventional input stacking structure 18 into which the stationery items 14 may be loaded. In addition, the feeding module 12 includes conventional feeding structure 20, suitable code sensing structure 22, and, preferably, conventional gate controlled output stacking structure 24. The feeding structure 20 may be any conventional top or bottom sheet feeding device 20. In the case of use of a top sheet feeding device 20, the code sensing structure 22 may be operatively associated with the feeding structure 20 for sensing the code A3 (FIG. 1) on the stationery item 14 (FIG. 2(a)) before feeding the item 14, from the stacking structure 18, whereas in the case of use of a bottom sheet feeding device 20, the code sensing structure 22 would ordinarily be operatively associated with the feeding structure 20 for sensing the code A3 (FIG. 1) on the stationery item 14 (FIG. 2(a)) after feeding the document 14 from the stacking structure 18. The output stacking structure 24 may be any conventional stacking structure of the type which includes a suitable bin 24A, and includes a stationery item diverting gate 24B. The gate 24B is disposed in the feed path of stationery items fed from the input stacking structure 18, and is selectively operable by the control structure 15 for diverting respective stationery items 14 out of the feed path and into the bin 24. The code sensing structure 22 is coupled to the control structure 16, which generates a digital signal, such as the signal 25, corresponding to the sensed code A3 as the stationery item 14 is fed past the sensing structure 20 The feeding module 12 additionally includes a motor 26 and one or more drive units 28 for the gate 24B of the output stacking structure 24, and feeding structure 20. In addition, the module 12 includes a plurality of sensors 30 for sensing the stationery items 14 in the feed path, and for sensing various positions of the motor 26 and drive units 28, including their respective home positions. The sensors 30 are coupled to the control structure 16, whereby the control structure 16 may provide digital signals, such as the signal 25, for indicating the aforesaid positions of the documents 14, and elements of the motor 26 and drive units 28. In addition, the feeder 20 may include conventional means such as a roller 32 for feeding the respective stationery items 14 from the feeder 12.

The apparatus 10 (FIG. 2(b)) may also optionally include a conventional printing module 40 for applying respective return codes A3 to uncoded stationery items 14, or to such items 14 that include an identification code D3 which is not suitable for use in the course of later sortation of the stationery items 14, or to stationery items 14 that include either an identification code D3, or other return code A3 which is not appropriately located on the stationery item. In addition, the printing module may be utilized for printing a postal bar code or permit mail serial number, or both, on respective items, with a view to ensuring rapid mailing by a customer or rapid processing by the Postal Services, or both, and thereby, for example, reducing customer "float". Assuming the provision of the printing module 40, the printing module 40 is preferably a conventional standalone device which includes suitable control structure 41, such as a microprocessor, for controlling the various structures and functions of the module 40. In addition, the module 40 includes a conventional operator interface 42, including a keyboard, which is conventionally coupled to the control structure 41 for operation thereof in response to input signals from the operator interface 42. The control structure 15 is also conventionally adapted to include a two-way serial or parallel communication link 43 for conventionally coupling the control structure 41 to an external source, such as the local computer hereinafter described, for operation of the control structure 41 in response to control signals such as the signal 43A, received from the external source. Thus, the module 40 is adapted to permit control of the structures and functions of the module 40 from an external source rather than from the operator interface 42. The module 40 additionally includes sensing structure 44 for sensing that a stationery item 14 has been received, and any suitable printing structure 46 for marking the stationery items 14 with a return code A3, bar code F3, or permit serial number F4, alone or in combination with each other. In addition, the module 40 includes conventional means 48 for feeding the stationery items 14 through and from the printing module 40 including a roller 50. Further, the feeding module 40, includes a motor 52 and includes one or more drive units 54 for the printing structure 46, in the event that mechanical printing structure is provided, and for the feeding structure 48. The module 40 also includes a plurality of conventional sensing devices 56 for sensing respective elements of the motor 52 drive units 54 printing structure 46 and feeding structure 48, and for sensing various positions of the stationery items 14 in the feed path through the printing module 40. Further, the respective sensors 44 and 56 are coupled to the control structure 41, whereby the control structure 41 may provide respective digital signals, such as the signal 58, indicating the receipt of stationery items 14 and the respective positions of the motor 52, printing structure 46, feeding structure 48 and drive units 54, including the respective home positions thereof, and various other positions of the stationery items 14.

The apparatus 10 (FIG. 2(b)) also includes a conventional inserting module 60 for inserting coded stationery items 14 into envelopes and sealing the same. The inserting module 60 is preferably a conventional standalone device which includes suitable control structure 61, such as a microprocessor, for controlling the various structures and functions of the module 60. In addition, the module 60 includes a conventional operator interface 62, including a keyboard, which is conventionally coupled to the control structure 61 for operation thereof in response to input signals from the operator interface 62. The control structure 61 is also conventionally adapted to include a two-way serial or parallel communication link 63 for conventionally coupling the control structure 61 to an external source, such as the local computer hereinafter described, for operation of the control structure 61 in response to control signals, such as the signal 63A, from the external source. Thus, the module 60 is adapted to permit control of the structures and functions of the module 60 from an external source rather than from the operator interface 62. The module 60 may optionally include conventional folding structure 64, depending upon the dimensions of the stationery items 14 ordinarily processed by a mailer. Whether or not a folding structure 64 is provided, the module 60 includes conventional envelope stacking structure 65 into which a plurality of window-type envelopes 66 are loaded, and includes sensing structure 68, coupled to the control structure 61, for sensing the presence or absence of envelopes 66 in the stacking structure 65. The module 60 additionally includes a conventional sheet sensing device 70, coupled to the control structure 61 for sensing the receipt of stationery items 14. Further, the module 60 includes suitable feeding means 72 for feeding the stationery items 14 through the module 60, and thus through the folding structure 64, if provided, where the stationery item 14 is folded for insertion purposes. The module 60 also includes an inserter 74 for inserting stationery items 14 into the respective envelopes 66. The module 60 may optionally include insert feeding structure 75 for adding one or more inserts to a stationery item 14 that is to be inserted into an envelope 66. For example, if the stationery item 14 is a remittance envelope, the remittance envelope may not include the address of the recipient to whom the envelope 66 is to be sent, as a result of which an additional insert would be needed which does include the recipient's address, properly positioned for exposure through the window of the envelope 66. Assuming multiple insertions, the module 60 would include a plurality of sheet sensing devices 70 for sensing the presence of one or more inserts and providing an appropriate signal to the control structure 61. In addition, the module 60 would be provided with appropriate accumulator structure 76 in which the stationery item 14 and additional inserts would ordinarily be stacked prior to insertion in the envelope 66, such that the address to which the envelope 66 is to be sent would be appropriately located for exposure through the window of the envelope 66 upon insertion. The module 60 also includes conventional sealing structure 77 for sealing the filled envelopes 66. Further, the inserting module 60 includes a motor 78 operably coupled to one or more drive units 79 for the feeding and inserting structures 72, 74 and 75. Further, the module 60 includes a plurality of additional sensors 70 coupled to the control structure 61, for detecting respective positions of the stationery items 14 and other inserts, and of elements of the motor 78 and drive units 79. The control structure 61 provides respective digital signals, such as the signal 80 corresponding to the presence or absence of envelopes 66 and stationery items 14 and other inserts, and the respective positions of the motor 78, drive units 79, stationery items 14, inserts and envelopes 66 as the respective sensors 68, and 70 sense such conditions. In addition, the feeding structure 72 may include suitable means, such as a roller 81 for feeding sealed envelopes 66 from the module 60.

The apparatus 10 (FIG. 2(*c*)) further includes a conventional postage metering module 85. The postage metering module 85 is preferably a conventional, standalone, electronic postage meter which includes suitable control structure 86, such as a microcomputer, for controlling the various structures and functions of the module 85. In addition, the module 85 includes a conventional operator interface 87, including a keyboard, which is conventionally coupled to the control structure 86 for operation thereof in response to input signals from the operator interface 87. The control structure 86 is also conventionally adapted to include a two-way serial or parallel communication link 88 for coupling the control structure 86 to an external source, such as the local computer hereinafter described, for operation of the control structure 86 in response to control signals, such as the signal 88A, from the external source. Thus, the module 85 is adapted to permit control of the structures and functions of the module 85 from an external source rather than from the operator interface 87. The module 85 further includes conventional sensing structure 89, coupled to the control structure 86, for sensing the receipt of a sealed envelope 66. The postage metering module 85 also includes conventional postage value setting structure 90 for setting the value of postage that is to be printed on the envelope 66, and a plurality of postage value sensing devices 90A, coupled to the setting structure 90 for sensing the postage value that is set, at any given time. Further, the postage metering module 85 includes conventional printing structure 91, which includes postage value printing means that is set by the value setting structure 90, for printing the set postage value. The metering module 85 also includes conventional envelope feeding structure 92 for feeding the sealed envelopes 66 through the metering module 85, and includes a motor 93 connected to one or more drive units 94, and a plurality of additional sensors 89 coupled to the control structure 86 for detecting respective positions of the envelope 66 and of elements of the motor 93 and drive units 94 including their respective home positions. In addition, the feeding structure 92 may include conventional means for feeding the envelope 66 from the metering module 85, such as a roller 95. Further, the microcomputer of the control structure 86 is preferably programmed for storing postage credit and used amounts 96 which respectively reflect, at any given time, the postage available for printing and the total of all postage that has been printed by printing structure 91. Preferably, the postage metering module 85 additionally includes card reading structure 96A, into which a postage credit or debit card of the type provided by a Postal Agency may be inserted. The reading structure 96A includes conventional logic circuitry coupled to the control structure 15 and constructed and arranged for interfacing with the logic circuitry of credit or debit card to change the total postage available for printing to a greater or lesser amount, depending upon the credit or debit amount stored in the card. And the control structure 86 provides respective digital signals, such as the signal 97, corresponding to the stored postage credit and used amounts, and the respective conditions sensed by the sensors 89 and 90A.

Assuming the other processing modules hereinafter described are not included, the apparatus 10 (FIG. 2(*c*)) may include a conventional stacking module 100. The stacking module is preferably a conventional standalone device which includes suitable control structure 101, such as a microprocessor, for controlling the various structures and functions of the module 100. In addition, the module 100 includes a conventional operator interface 102, including a keyboard, which is conventionally coupled to the control structure 101 for operation thereof in response to input signals from the operator interface 102. The control structure 101 is also conventionally adapted to include a two-way serial or parallel communication link 103 for coupling the control structure 101 to an external source, such as the local computer hereinafter described, for operation of the control structure 101 in response to control signals, such as the signal 103A, from the external source. Thus, the module 100 is adapted to permit control of the structures and functions of the module 100 from an external source rather than from the operator interface 102. The module 100 further includes envelope feeding structure 104, a sensor 105 for sensing the presence or absence of respective envelopes 66, and a stacking structure 106 to which the envelopes 66 are fed. In addition, the stacking module 100 includes a motor 107 connected to one or more drive units 108 for driving the feeder 104, and a plurality of sensors 109 coupled to the control structure 101 for detecting respective positions of elements of the motor 107 drive units 108 and various positions of the envelopes 66, whereby the control structure 101 may provide respective digital signals, such as the signal 110, corresponding to the conditions sensed by the sensors 105 and 109.

The apparatus 10 (FIG. 2(*c*)) may also include other, optional, processing modules equipment 112, for example, an additional printing module 40 for printing a bar code corresponding to the zip code on the envelope 66 to permit mechanized bar code sortation by the Postal Service or by a sorting module 130 of the type hereinafter described in greater detail. Preferably, a sorting module 130 is provided for pre-sorting envelopes 66 into a plurality of different destination zones in order to take advantage of the reduced postage costs which accrue to mailers that pre-sort mail for the Postal Service, thereby reducing the mail processing burden on the Postal Service.

Whether or not the aforesaid other modules 112 are provided, the mail from the stacking module 100, or such other modules 112, is delivered to the Postal Service for ultimate delivery to the destination identified by the addressee on the envelope 66.

Assuming delivery by the Postal Services of the mail, most but not all of the addressees who receive an enclosed, coded, return envelope, or other coded return stationery item 14 will return the same to the business mailer. However, some mailpieces 120 (FIG. 2(*c*)) will be received in envelopes that do not bear a return code A3, whether or not such a return stationery item 14 was provided, and other mailpieces 120 will be received in envelopes that do not contain a sort coded return stationery item 14, whether or not such a return item 14 was provided.

For processing incoming mailpieces 120 (FIG. 2(*c*)) the apparatus 10 includes a conventional sorting module 130. The sorting module 130 is preferably a conventional standalone device which includes suitable control structure 131, such as a microprocessor, for controlling the various structures and functions of the module 130. In addition, the module 130 includes a conventional operator interface 132, including a keyboard, which is conventionally coupled to the control structure 131 for operation thereof in response to input signals from the operator interface 132. The control structure 131 is also conventionally adapted to include a two-way serial or parallel communications link 133 for coupling the control structure 131 to an external source such as the local computer hereinafter described, for operation of the control structure 131 in response to input signals, such as the signal 133A from the external source. Thus the module 130 is adapted to permit control of the structures and functions of the module 130 from an external source rather than from the operator interface 132. The module further includes conventional singulating structure 134, of the type which will accommodate different sizes of mailpieces 120, for singulating mailpieces 120 loaded into the structure 134 for processing. The sorting module 130 also includes sensing structure 136, coupled to the control structure 131, for sensing whether or not mailpieces 120 are available for singulating. In addition, the sorting module 130 includes feeding structure 138 for feeding singulated mailpieces 120 from the singulating structure 132, and includes sensing structure 140, coupled to the control structure 131, for sensing return codes A3 on the respective mailpieces 120. Further, the sorting module 130 includes a plurality of sorting location structures 142 for stacking the mailpieces 120 that are fed by the feeding structure 138 to the sorting location structure 142. Inasmuch as some of the mailpieces 120 do not include a return code A3, one or more of the sorting location structures 142 is a no-code sorting location structure 142 for accommodating uncoded mailpieces 120. The sorting module 130 additionally includes a motor 144 connected to one or more drive units 146 which are coupled to the singulating structure 132, feeding structure 138 and sorting location structures 142, and includes a plurality of position sensing devices 148 which are coupled to the control structure 131 for sensing respective positions of the mailpieces 120 and of elements of the motor 144, drive units 146 and sorting locations structures 142. The control structure 131 provides digital signals, such as the signal 150, corresponding to the conditions sensed by the sensors 136, 140 and 148, when such conditions are sensed. The mailpieces 120 from the sorting location structures 142 are then hand-delivered to the addressee corresponding to the sort location or, in some instances, to other equipment for further processing, it being noted that depending on the volume of uncoded mailpieces 120, the process of opening letters and extracting their contents may be mechanized.

Assuming further machine processing of the mailpieces 120, the apparatus 10 (FIG. 2(*b*)) may include a conventional letter opening module 160, to which the uncoded mailpieces 120 are hand-delivered. The module 160 is preferably a conventional standalone device which includes suitable control structure 161, such as a microprocessor, for controlling the various structures and functions of the module 160. In addition, the module 160 includes a conventional operator interface 162, including a keyboard, which is conventionally coupled to the control structure 161 for operation thereof in response to input signals from the operator interface 162. The control structure 161 is also conventionally adapted to include a two-way serial or parallel communications link 163 for coupling the control structure 161 to an external source, such as the local computer hereinafter described, for operation of the control structure 161 in response to input signals, such as the signal 163A, from the external source. Thus, the module 160 is adapted to permit control of the structure and functions of the module from an external source rather than from the operator interface 162. The module 162 also includes sensing structure 164 coupled to the control structure 161 for sensing whether or not mailpieces 120 are available for opening. The module 160 additionally includes letter feeding structure 166, opening structure 168, contents extracting structure 170, envelope discard structure 172, and contents stacking structure 174. In addition, the module 160 includes a motor 176 connected to one or more drive units 178 which are respectively coupled to the feeding 166, opening 168, extracting 170, discarding 172 and stacking 174 structures, and a plurality of sensors 180, coupled to the control structure 161, for sensing respective positions of elements of the motor 176 and drive units 178, various elements of the structures 166, 168, 170 and 172, and of the mailpieces 120. The control structure 161 provides respective digital signals, such as the signal 182, which corresponds to the conditions sensed by the sensors 164 and 180. Thereafter the mailpiece contents from the stacker 174 are manually processed, for example for separating the contents from one another.

The separated contents of mailpieces 120 may include personal checks with or without coded remittance slips or other return stationery items 14. All coded remittance slips with which a check is received that covers the full amount of payment due may be processed on a different basis than those that do not include a full payment, depending upon the business practices of the recipient. However, assuming a large volume of coded remittance slips or other coded stationery items 14, the coded items 14 may be hand-delivered to the sorting module 130 for further sortation as hereinbefore discussed.

According to the invention, each of the modules 12, 40, 60, 85, 100, 112, 130 and 160 is constructed and arranged to be interfaced with a local computer 180, and a remotely located computer as hereinafter discussed, via conventional, two-way, control and data serial or parallel communication lines. To that end, the local computer 180 may be any commercially available computer having a sufficient number of communication ports programmable for serial or parallel communications, as the case may be, to provide a separate two-way serial or parallel communications link for each of the aforesaid apparatus modules and the remote computer. In addition, the local computer generally includes a plurality of discrete circuits including those for a plurality of central processing units, each of which includes control circuits 186, program memory 188, a plurality of registers 190 and an arithmetic logic unit 192, those for one or more oscillators and clocks 194, data memories 196, timer and event counters 198, and program expansion control 200. In addition, the local computer 180 includes additional registers circuits for storing a log 202 of return codes A3, each of which preferably uniquely identifies a specific stationery item, or a person, or firm, corporation, company or other business entity to whom one or more stationery items are sent. Further, the local computer includes additional register circuits for storing a plurality of dispositive data listings 204, each of which is associated on a one-for-one basis with one of the return codes A3 of the log 202. The local computer 180 also includes a plurality of register circuits for storing a main line program 300, a plurality of module routines, 350, 380, 400, 440,460, 500, and 530, i.e., one for each of the apparatus modules, and a plurality of additional registers 206 for future use or for use as working registers and other permanent or temporary data storage purposes. In addition, the local computer 180 includes a conventional local terminal which is conventionally operably interconnected to the remainder of the local computer 180. The local terminal generally includes a plurality of processing circuits 214 conventionally interconnected to a keyboard 216, display 218, disk drive 219 and printer 220.

Each of the dispositive data listings 204 includes data corresponding to at least one, and may include data corresponding to a plurality of operation(s) to be implemented by the apparatus according to the invention. The respective operations, may be in the form of routines for implementing respective operations or messages, each of which relates to the preparation and disposition and other matters concerning mailing envelopes or other stationery items whether or not such items bear a return code A3. For example, each of the listings 204 preferably includes a message identifying the sortation location 142, of the sorting module 130, to which each mailpiece 120 bearing the return code A3 associated with listing 204, is to be delivered when the mailpiece 120 is sorted. Further, respective listings may include the postal bar code of the addressee, the business mailer's postal bar code and the business mailer's permit mail serial number. In addition a given listing 204 may include a message indicating that upon sensing the code A3 on a given stationery item a routine is to be implemented causing a message is to be transmitted to a remote computer indicating that the stationery item bearing the particular code has been detected, together with the time and date of detection, and information indicating whether such detection occurred in the course of outgoing letter or incoming mail processing. Preferably, the remote computer is conventionally programmed for printing such messages when these are received. Thus, an operator at the remote computer location may, according to the invention be provided with a message indicating that code detection of a particular stationery item occurred at the feeding module 12, where the item was diverted to the output stacker 24 rather than being fed to the printing module 40. Or, code detection occurred at the sorting module, where the mailpiece was sorted to a particular sortation location 142. In connection with the foregoing, it is noted that in the course of the time delay between generating particular stationery item bearing a return code and stacking the items in the feeding module 12, the business mailer may have added a message to the dispositive data listing, for the particular code bearing stationery item, which indicates that the item is to be diverted to the output stacker 22 at the feeding module 12, due to the occurrence of an event which was not known at the time the particular coded stationery item was prepared, for example to avoid double billing. Thus, any particular stationery items may be so diverted at the feeding module with the result that postage printing costs are avoided. Further, when a given code is detected, its listing 204 may include a message causing the local terminal printer 220 to print a notice adapted to be mailed to an addressee named in the message, which addressee may, but need not be, the addressee identified by the detected code A3. Or, the listing may also include a message causing the printing of a notice which indicates that a particular person is to be contacted by phone. In addition, the listing may include one or more other messages, which are to be printed at either the local or a remote computer terminal, concerning one or more elements of the current history of correspondence between the addressee and the mailer, such as a change in the addressee's address including the zip-code, or a message causing printing of the corresponding bar code, addition of the addressee's tax code number, telephone number or facsimile terminal number, or any other information relevant to the current relationship between the addressee and mailer or operation of any of the modules hereinbefore discussed.

Further, the processing circuits 214 of the local computer terminal 212 are conventionally programmed to permit the call-up, display and modification of the return code log 202 and the dispositive data listings 204 respectively associated with each of the return codes A3 of the log 202. In addition, the terminal 212 is conventionally programmed to permit the contents of any of the dispositive data listings 204 to be changed at any time in accordance with operator entries of appropriate instructions from a remote computer or from the local terminal keyboard 216. In addition, the local computer terminal 212 is conventionally programmed to permit programming the same from a conventional disk inserted into the disk drive 219. Further the terminal 212 is conventionally programmed to permit the call-up and printing out at the printer 220, in response to operator input from the keyboard 216, the whole or any part of the log 202, alone, or in combination with the whole or any part of any or all of the disposition data listings.

The apparatus 10 (FIG. 2) may also include a remote computer 250 and conventional means for providing a serial or parallel communications link 252, via ports 254, between the local computer 180 and remote computer 250. The remote computer 250 is preferably programmed to include a copy of the log 202 and dispositive data listings 204 stored in the local computer 180. In addition, the remote computer 250 includes conventional main line programming 600 for communicating with the local computer 180, and for changing the contents of the log and dispositive data listings in both the local and remote computers 180 and 250. The program 600 includes conventional routines for responding to communications from the local computer 180 or from operator input from one or more terminals of the remote computer 250. Further, the remote computer 250 includes at least one local terminal such as the terminal 212.

Figure 3:
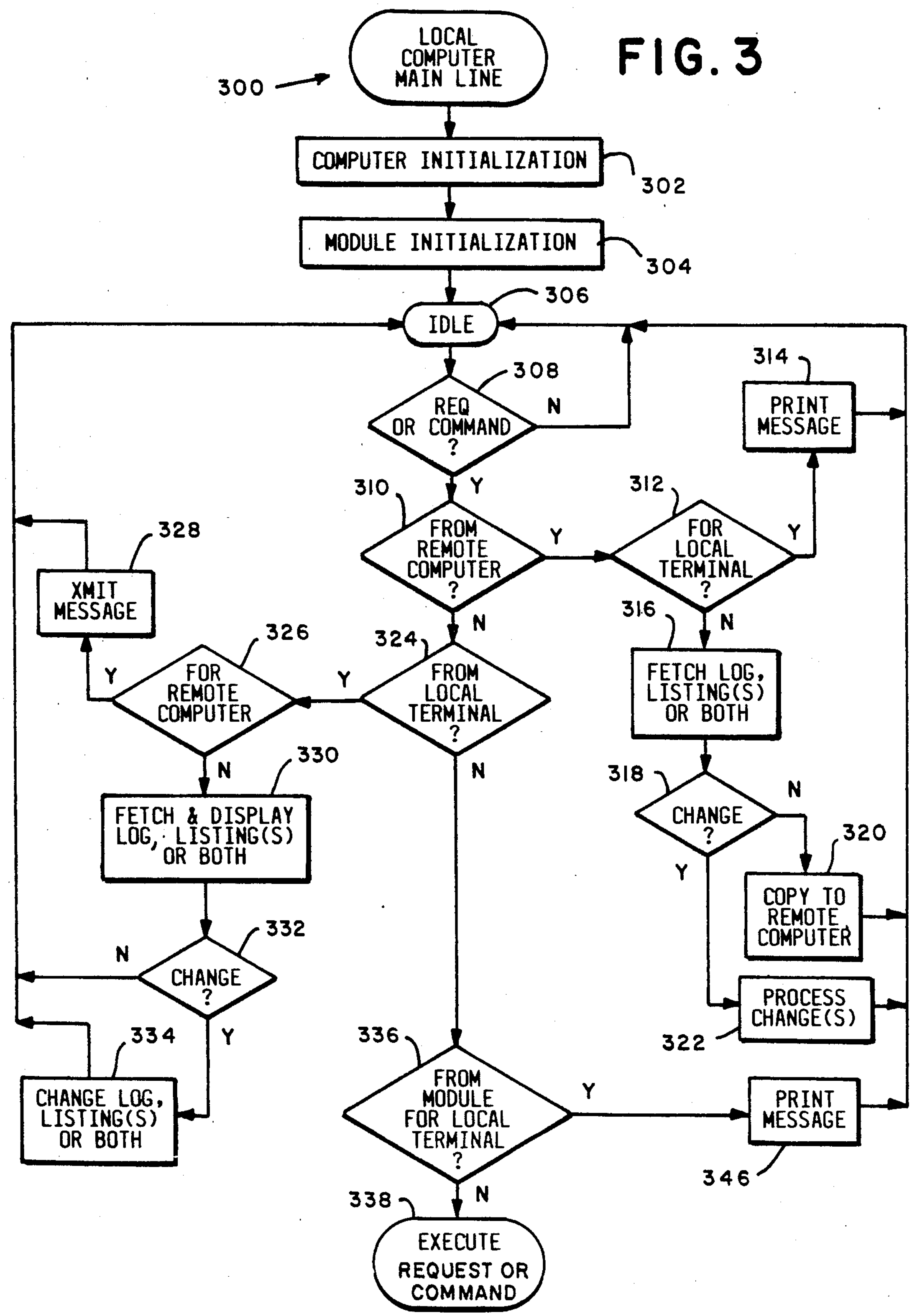
FIG. 3 is a flow chart showing the processing steps implemented by the main line program of the local computer shown in FIG. 2(*a*)
Figure 4A:
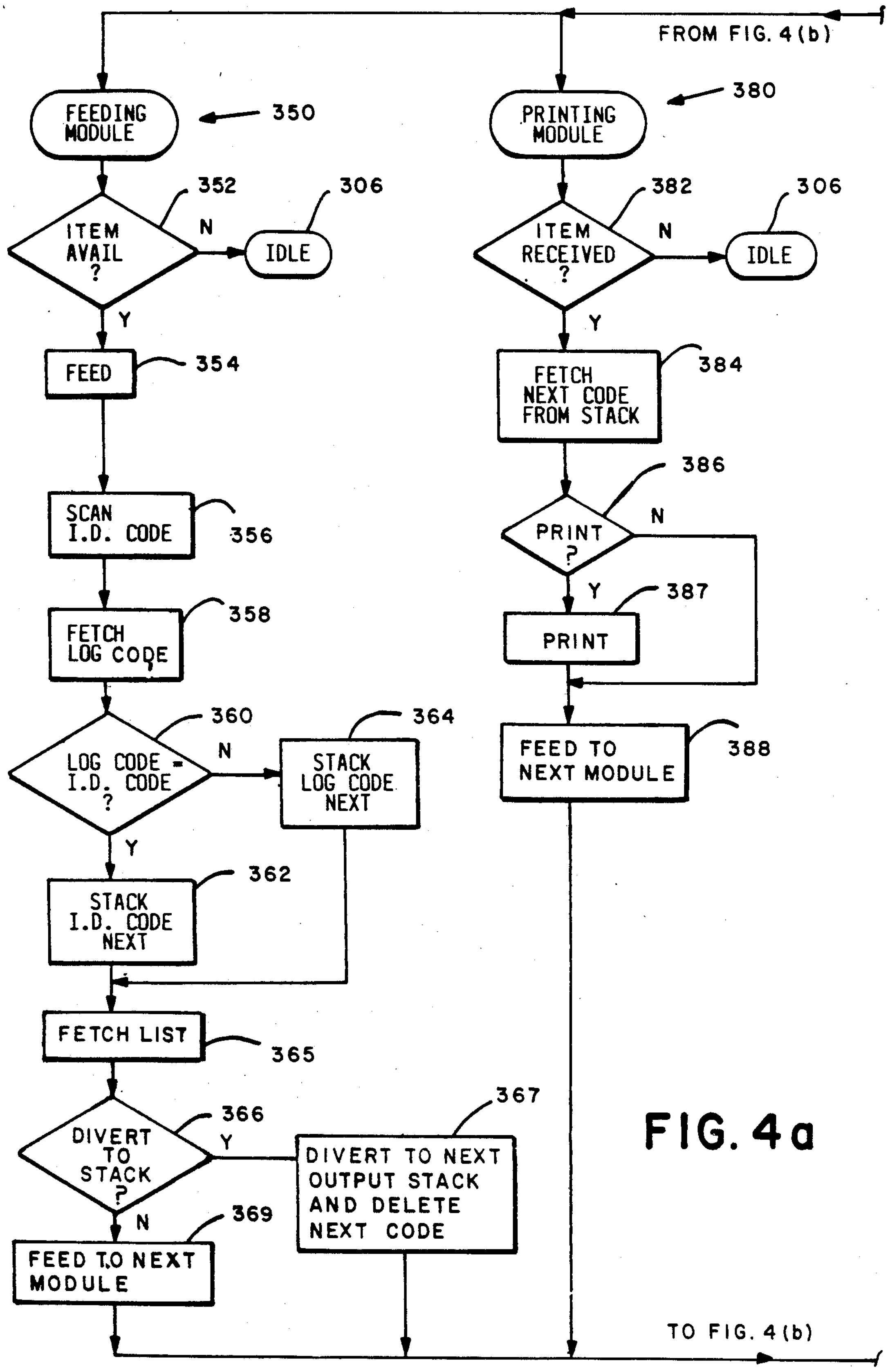
FIG. 4(*a*) is a flow chart showing the processing steps implemented by the local computer of FIG. 2(*a*) for controlling the feeding and printing modules of the processing apparatus of FIG. 2(*a*)
Figure 4B:
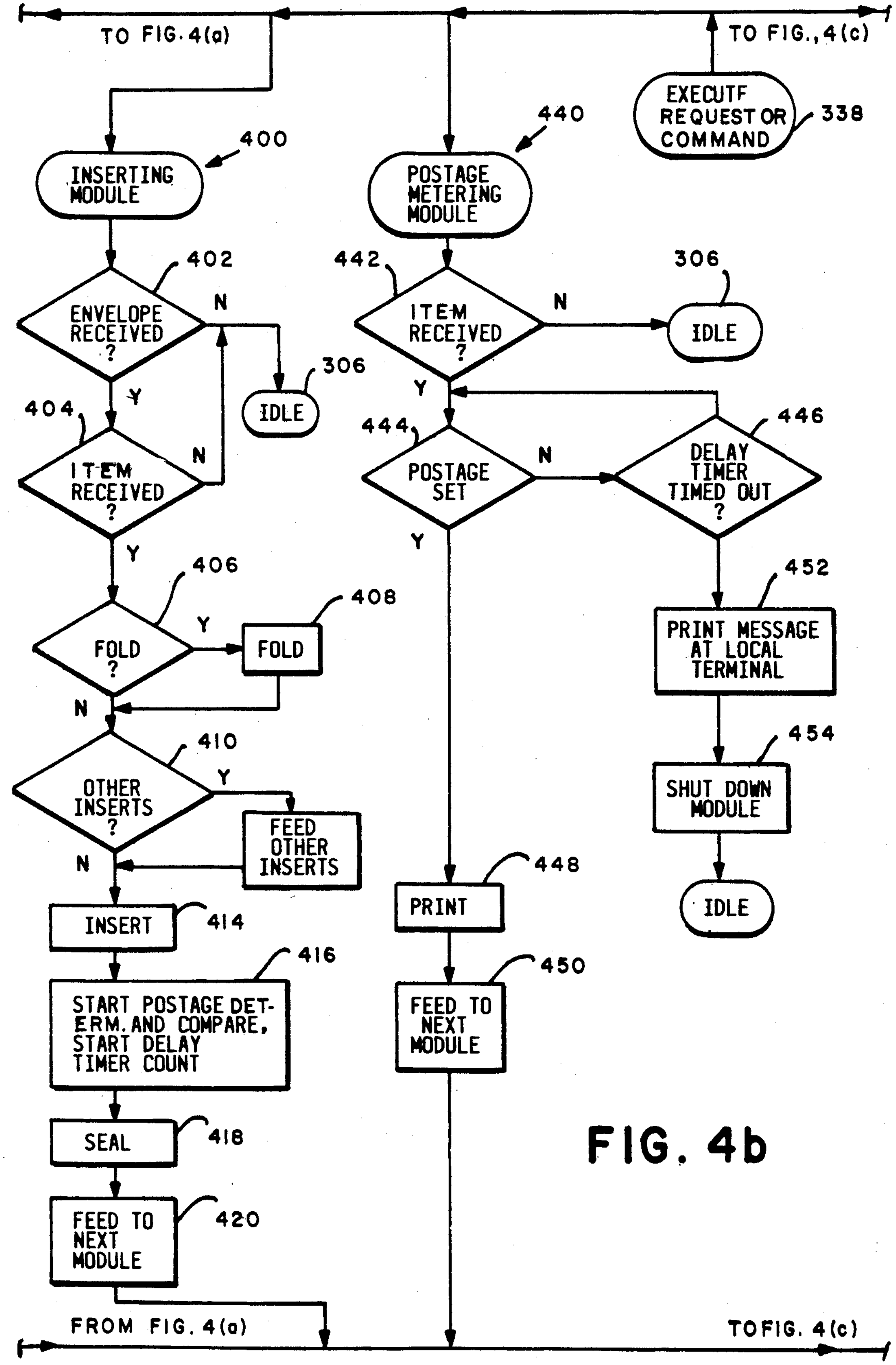
Figure 4C:
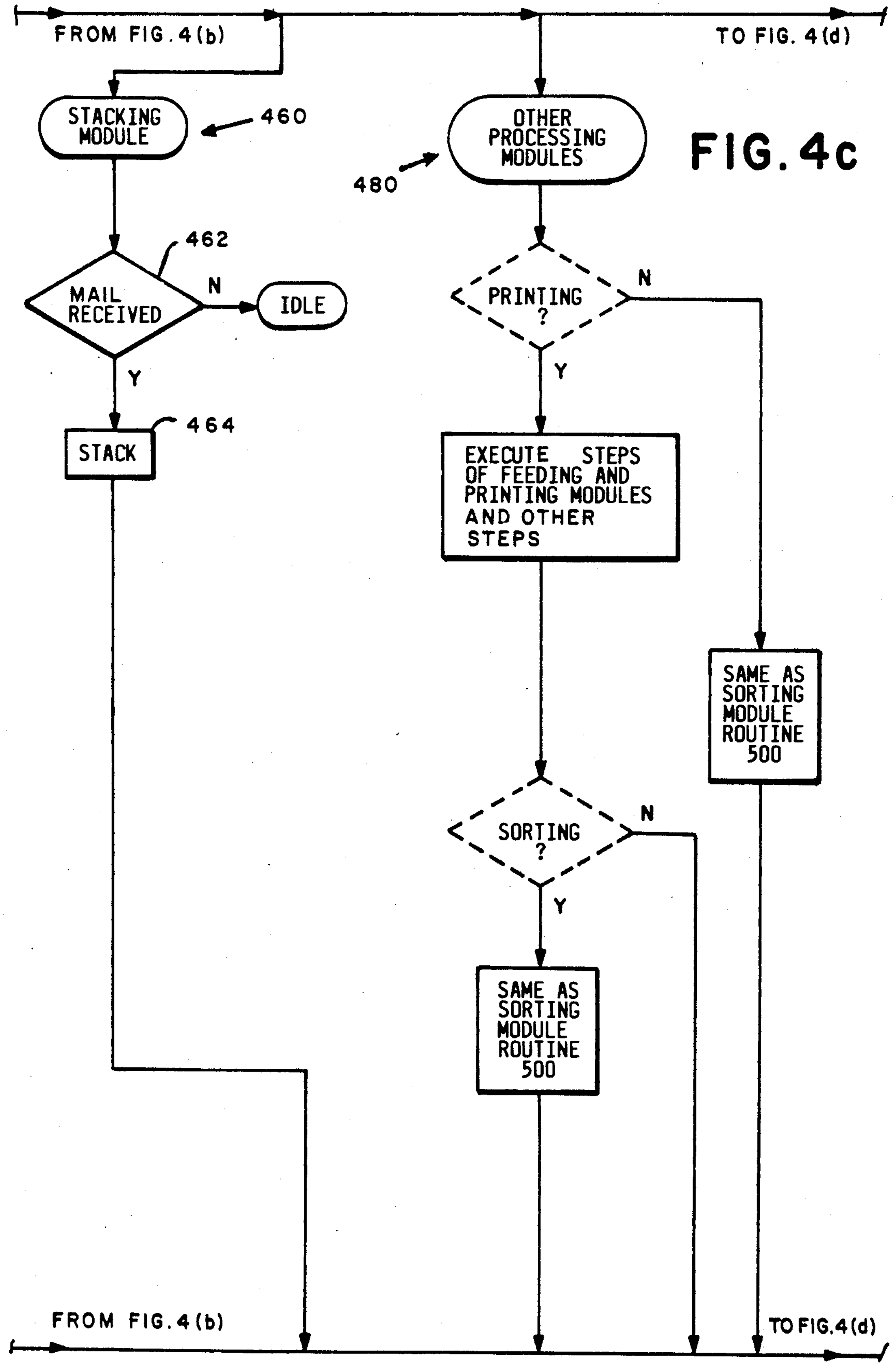
Figure 4D:
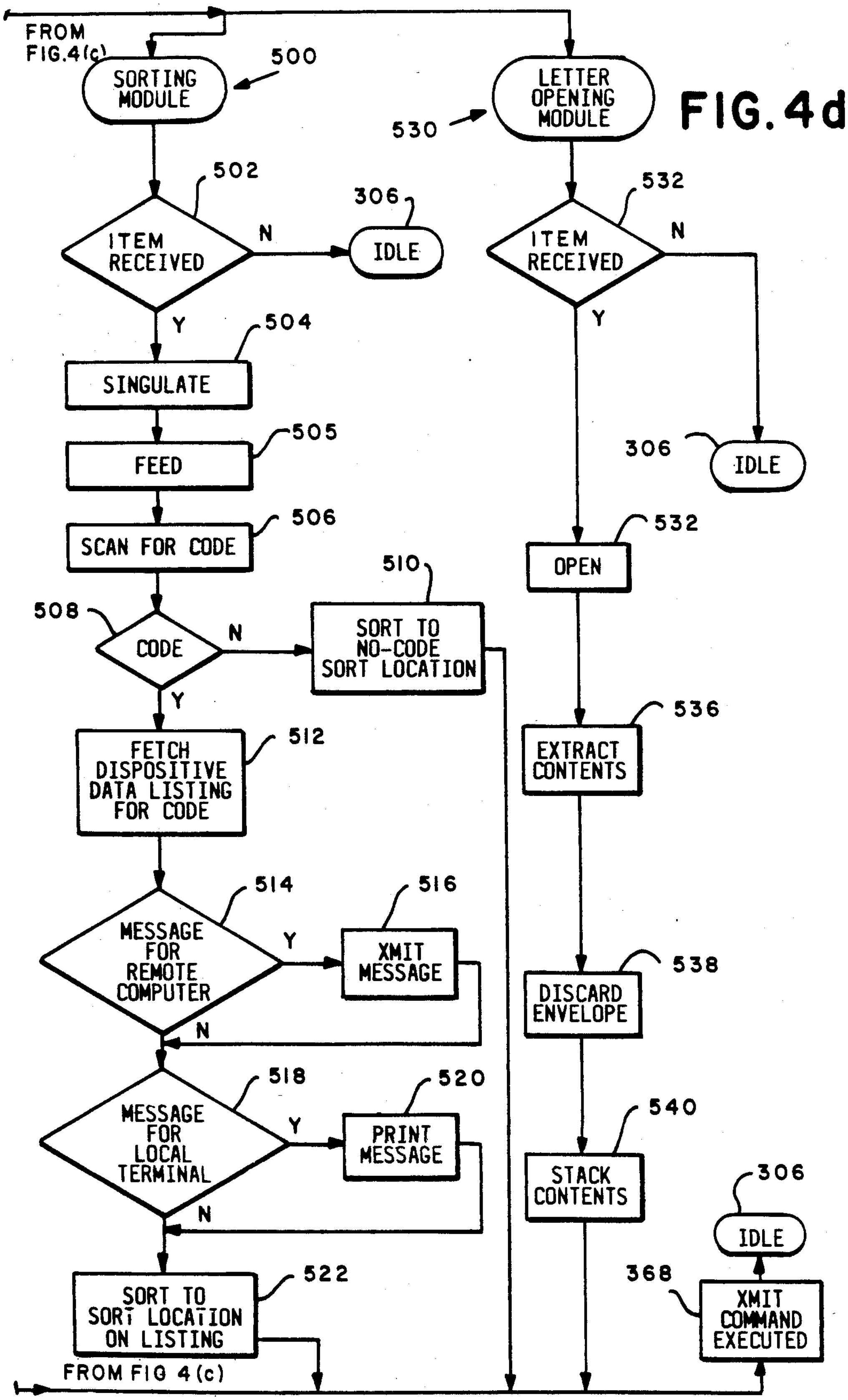

In general, the local computer 180 includes two software programs including a main line program 300 (FIG. 3) and a plurality of command execution programs 400 (FIG. 4).

The local computer's main line program 300 (FIG. 3) commences with the step 302 of conventionally initializing the local computer 160, which generally includes establishing the initial voltage levels at the computer ports utilized for the control and data communications lines of the apparatus modules, and setting the timers and counters. Thereafter the local computer 300 communicates with the respective apparatus modules and causes their respective motors and other drive units to be conventionally initialized, step 304. Step 304 entails causing the control structure microprocessors of the various modules to scan the various microprocessor ports associated with the motors drive units and sensors of the modules for determining whether or not the sensed elements of the motors and drive units, such as their respective output elements, are properly located for initiating operation of the various components of the modules and, if not, the program 300 causes the motors and drive units to be driven to urge the respective elements, and thus the motors and drive units, to their respective home positions.

Assuming the initialization steps 302 and 304 are completed, the program 300 enters an idle loop routine, step 306. In the idle loop routine 306 a determination is initially made as to whether or not a request or command has been received from one of the apparatus modules 12, 40, 60, 85, 100, 112, 130 or 160, the remote computer 250 or from the local terminal 212, step 308. Assuming a request or command has not been received 308, processing is returned to idle 306. When a request or command 308 is received, a determination is made as to whether or not the request or command 308 is from the remote computer, step 310. If the request or command is from the remote computer 310, a determination is made as to whether or not it is directed to utilization of the local terminal, step 312. Assuming a determination is made that the request or command is for the local terminal 312, the program 300 causes the local terminal to execute the request or command, i.e., print the message 314, and then causes processing to be returned to idle 306. If the determination which is made is that the request or command is not for the local terminal 312, then the program causes the log, listing(s) or both to be fetched, step 316, followed by making a determination as to whether or not the log, listing(s) or both are to be changed, step 318. If no change is to be made 318, since the only other reason for fetching the log, listing(s) or both is to copy the same to the remote computer, the program 300 causes the log, one or more of the listings or both are copied to the main computer, step 320, followed by causing processing to be returned to idle 306. If a change is to be made 318, then the program 300 causes processing to be implemented to change the log, one or more of the listings, or both, step 322, followed by the program 300 returning processing to idle 306.

Returning to step 310, if a determination is made that the request or command 308 is not from the remote computer 310, the program 300 then implements processing to determine whether or not the request or command 308 is from the local terminal, step 324. If it is, 324, a determination is then made as to whether or not the request or command is for the remote computer, step 326, and, assuming that it is, the request or command, i.e., message, is transmitted to the remote computer, step 328, followed by the program 300 causing processing to be returned to idle 306. However, if the message is not for the remote computer 326, since the request or command may only be to fetch the log, one or more of the listings, or both, for display, the log, one or more of the listing(s), or both, are displayed, step 330. Thereafter, the program 300 executes the step 332 of making a determination as to whether or not a change is to be made. If a change is to be made 332, the program causes the log, one or more listings, or both, to be changed, step 334, followed by causing the return of processing to idle 306, whereas if no change is to be made 332, processing is caused to be returned directly to idle 306. Due to processing being returned to idle 306 when no change is to be made 332, if a request or command 308 is received from the remote computer 310 before receiving a request or command 308 from the local computer terminal 324, the request or command from the remote computer 310 will be processed 312–322 prior in time to processing any request or command from the local terminal 324. Thus processing priority is given to requests or commands from the remote computer 310 over those from the local terminal 324.

Referring to step 324, if a determination is made that the request or command 308 is not from the remote computer 310 and not from the local terminal 324, then the request or command must necessarily be from one of the apparatus modules, whereupon a determination is made as to whether or not the request or command is or is not for the local terminal, step 338. Assuming it is for the local terminal 338 the message is printed, step 340. And, if the message is not for the local terminal 338, since the request or command must then be a request or command to be executed for one of the modules, the program executes the request or command, step 338 (FIGS. 3 and 4(*b*)).

As shown in FIG. 4, which includes FIGS. 4(*a*), 4(*b*), 4(*c*) and 4(*d*), requests and commands from the various apparatus modules that are for the modules and not directed to use of the local terminal 334 (FIG. 3), are handled by the local computer (FIG. 3) on a first-come, first-serve basis. In the preferred embodiment however, the local computer 180 has the capacity to handle parallel processing of requests and commands from and for the apparatus modules, as a result of which the local computer response time for execution of any given request or command does not in any event have an effect upon the timeliness of the stationery item processing functions of the respective modules.

Assuming that the feeding module 350 (FIG. 4(*a*)) routine is called up, a determination is initially made, step 352, as to whether or not a stationery item is available for feeding from the stacker of the feeding module.

Assuming that an item is not available, processing is returned to idle 306 to permit the program to execute the next request or command until such time as an item is available 352. Assuming that a stationery item is available 352, the program causes the item to be fed by the module's feeding device, step 354. As the stationery item is being fed, the identification code on the item is caused to be scanned by the module's code sensor, step 356. Thereafter the routine causes the log code that is to be used for processing stationery items bearing the identification code to be fetched, step 358, and causes a comparison to be made to determine whether or not the log code and identification code are or are not the same, step 360. If a determination is made that they are the same, step 362, then the program causes the identification code to be stacked as the next code to be used for reference purposes in the course of inspection and preparation of stationery items. If they are not the same, step 362, then, processing is executed for storing the log code in the stack as the next code which is to be used for reference purposes in the course of inspection and preparation of the stationery items, step 364. Having identified the next code that is to be used for inspection of the stationery item, the program executes the step of fetching the dispositive data listing corresponding to that code, step 365, and causes a determination to be made as to whether or not the stationery item is to be diverted to the feeding module's output stack, step 366. If the determination is made that it is to be diverted, step 366, then, the program executes the step 367 of causing the stationery item to be diverted to the output stack and deleting the stacked code from the next code stack, followed by causing a message to be transmitted to the feeding module, step 368 (FIG. 4(*d*)) indicating that the request or command has been executed. Whereupon the program causes processing to be returned to idle 306. On the other hand, if the listing does not indicate that the stationery item bearing the code is to be diverted to the feeding module's output stack, step 366, then the program causes the stationery item to be fed to the next module, step 369, followed by the program causing a message to be transmitted to the feeding module which indicates that the request or command has been executed, step 368, and then causing processing to be returned to idle, step 306.

Assuming the request or command 338 (FIG. 4(*a*)) is concerned with the printing module, the printing module routine 380 is called-up and a determination is initially made as to whether or not the stationery item has been received by the printing module, step 382. Assuming a stationery item has not been received, the program causes processing to be returned to idle 306 to permit execution of the next request or command. Assuming the document is received, step 382, the next code from the code stack is fetched from the stack, step 384, i.e., the log code 364 or identification code 362 which was stacked as the next code in the course of execution of the feeding module routine 350. In addition, or alternatively, the dispositive data listing associated with said code may be fetched. Thereafter, the program executes the step 386 of making a determination as to whether or not the fetched code or one or more messages included in the dispositive data listing, such as a bar code or permit mail serial number, has to be printed. If it does, the program causes the printer of the printing module to print the appropriate code or number on the stationery item, step 387. Whether or not printing is caused to occur, the routine 380 thereafter causes the stationery item to be fed to the next module, step 388, for example to the inserter module, followed by a message being caused to be transmitted to the printing module to indicate that the request or command has been executed 368, followed by processing being caused to return to idle 306.

Assuming that the request or command 342 (FIG. 4(*b*)) is concerned with the inserting module the inserting module routine 400 is called up and a determination is initially made as to whether or not a mailing envelope is available, step 402. Assuming the mailing envelope is not available processing is returned to idle 306 for execution of the next request or command until an envelope is available. Assuming that a mailing envelope is available, step 402, a determination is then made as to whether or not the coded stationery item has been received from the printing module, step 404. Assuming that the coded stationery item has not been received, step 404, processing is again returned to idle 306 for execution of the next request or command 338 until the coded stationery items are received. Assuming that a stationery item is received 404 a determination is then made as to whether or not the item is to be folded, step 406. If it is not to be folded, a determination is made as to whether or not other inserts are to be included with the stationery item, step 410, whereas if the stationery item is to be folded, step 406, it is folded, step 408, and then the determination is made, step 410, as to whether or not other inserts are to be included with the stationery item. Assuming other inserts are not involved, step 410, the folded or unfolded stationery item is caused to be inserted into the envelope, step 414, whereas, if other inserts are involved, step 410, the other inserts are caused to be fed the accumulator of the inserter module, where they are stacked in a stack consisting of the other inserts and the folded or unfolded stationery item. Thereafter, the stack contents are caused to be inserted into the envelope, step 414. After the insertion step 414, the local computer routine causes the postage value for mailing the envelope to start being determined, step 416, either by calculation or by means of utilizing a look-up table. In addition, the routine 400 causes a delay timer to start counting, step 416. As the postage value determination and timer functions are being completed, step 416, the next step 418, of causing the envelope to be sealed is executed, followed by the sealed envelope being fed to the next module, step 420. Whereupon a message is transmitted to the inserting module to indicate that the request or command has been executed 368 (FIG. 4(*d*)) followed by the routine causing processing to be returned to idle 306.

Assuming that the request or command 338 is concerned with the postage metering module, the postage metering module routine 440, is called up, and processing is initiated by execution of the step 442 of making a determination as to whether or not the next envelope has been received. If a determination is made that the envelope has not been received, step 442, processing is returned to idle 306 for execution of the next request or command, whereas if the envelope has been received 442 a determination is then made as to whether or not the postage is set, step 444. Assuming that a determination has been made that the postage has not been set 444, an inquiry is then made as to whether or not the delay timer has timed out, step 446. Until such time as the delayed timer has timed out, the processing continues to loop through step 444 and 446 until such time as either a determination has been made that the postage has been set 444 or the delay timer has timed out 446. If the postage is set 444 before the delay timer times out 446, the determination is made that the postage is set, step 444. Whereupon the routine causes the postage to be printed 448, followed by the mail being caused to be fed 450 to the next, module step 450. A message being transmitted to the postage metering module that the request or command has been executed 368 (FIG. 4(*d*)), and then by processing being caused to be returned to idle 306. On the other hand, if the postage is not set, step 444, before the delay timer times out, step 446 it is assumed that the postage meter setting system is in need of maintenance, inasmuch as the delay timer is set for a long enough time interval to allow for any postage meter setting to be changed to any other postage meter setting prior in time to the delay timer timing out. Accordingly, under such circumstances the routine 440 causes a message to be printed at the local terminal, step 452, to indicate that an error condition exists and appropriate maintenance personnel should be called in to check on the operation of the postage meter. Whereupon the routine 440 causes the printing module to be disabled to prevent further usage, step 454, i.e., shut down. Thereafter, the routine causes processing to be returned to idle 306. For the purposes of this disclosure, it will be assumed that the postage is set, step 444, followed by the routine causing steps 448, 450, 368 and 306 to be consecutively executed.

Assuming that the request or command to be executed 338 (FIG. 4(*c*)) is concerned with the stacking module, the stacking module routine is called up, step 460 and processing is initiated by making a determination as to whether or not the mail has been received from the postage printing module, step 462. If mail has not been received, processing is caused to be returned to idle 306 for execution of other commands and requests until such time as a mailpiece is received, step 462. When the mailpiece is received, step 462, the routine 460 causes the mailpiece to be stacked, step 464, followed by causing a message to be transmitted to the stacking module indicating that the request or command has been executed, step 368 (FIG. 4(*d*)) and then causing processing to be returned to idle 306.

Assuming that other outgoing mail processing modules are involved in processing the mail and the request or command to be executed is directed to such other processing modules, the appropriate other processing module routine(s), step 480, are called up. For the purpose of this disclosure, it will be assumed that the other processing involved is to either print a bar code on the envelope or pre-sort the same prior in time for delivery to the Postal Service, or both. Accordingly, assuming that the other processing routine is called up 480, and assuming bar code printing is involved 482, the mail is processed to print a bar code on the mailpiece, the mailpieces would be processed in accordance with the steps set forth in the feeding modules and printing module routines 350 and 380, except for step 384 of the printing module routine 380 being executed to make additionally fetch the bar code from the dispositive listing associated with the next code and except for the printing step 387 being additionally executed to cause the bar code to be printed. Assuming however that pre-sorting alone, or pre-sorting after bar code printing is involved, then the processing would involve execution of the steps of the sorting module routine hereinafter discussed.

The foregoing discussion of local computer processing primarily applies to the preparation of returnable stationery items, and the envelope into which they are inserted for delivery to the Postal Service. On the other hand, returnable stationery items are processed by carriers other than the Postal Service and may be prepared in much the same manner without departing from the spirit and scope of the invention, which includes, but is not limited to, providing on each returnable stationery items, whether or not it is included in an outgoing envelope, a return code uniquely identifying the stationery item or recipient of the returnable stationery item. Also, in accordance with the above discussion, the return code, or a code which is preprinted on a given stationery item, may be utilized for accessing the dispositive data listing associated with the code for determining whether or not the stationery items should be continued to be prepared for mailing, and, if the dispositive data listing indicates that it is not, the given stationery items may be out-sorted from the mail preparation stream prior in time to marking an envelope therefor with postage. With the result that postage waste that might otherwise occur is eliminated. Further, inasmuch as some mailpieces do not reach the recipient to whom they are mailed, with the result that the entire mailpiece is returned to the business mailer, it is within the scope of the invention to print the return code on the outgoing envelope, utilizing a printing module after processing is completed by the inserting module. Thus, the aforesaid unique code identifying the outgoing mailpieces or its recipient may be utilized for facilitating the appropriate disposition of returned mailpieces.

For discussion purposes, it will be assumed that the mailpieces have been prepared for delivery to the Postal Service. Whereupon they are processed by the Postal Service for delivery and manually delivered to the recipient. Thereafter, the pre-coded returnable stationery items are mailed back in pre-coded envelopes or, in some cases in envelopes that do not bear the return code. In any event, incoming return coded mail 120 would be delivered to the sorting module 130 (FIG. 2) for sortation upon being received by a business mailer.

Referring to FIG. 4(*d*), and assuming that the request or command is concerned with the sorting module, local computer would call up the sorting module routine, step 500, which initiates processing by making a determination as to whether or not a stationery item has been received. Assuming that it has not been, step 502, processing would be caused to loop to idle 306 until a stationery item is received. Assuming however that a return stationery item has been received, step 502, the routine 500 causes the item to be singulated step 504, then fed, step 505 and, as it is fed 505, scanned for the return code, step 506. At this juncture, the routine 500 executes the step of making a determination as to whether or not the item has a code 508. If it does not, step 508, the routine causes the inserter module to be operated to sort the item to a no-code sortation location 510. Whereupon a message is transmitted to the inserter module indicating that the request or command has been executed, step 368, followed by the routine causing processing to be returned to idle 306. However, if at step 508 it is determined that the stationery item is coded, the routine 500 executes the step of fetching the dispositive data listing corresponding to the return code, step 512. Thereafter the routine initially makes a determination as to whether or not the fetched listing includes a message for the remote computer, step 514. If it does the message is transmitted, step 516, to the local computer. The message 516 may include, for example, one that simply tells the remote computer that the return coded stationery item has been received, or one that tells the remote computer to execute a routine that results in printing out a hard copy message for a particular person at the location of the remote computer. Assuming the message has been transmitted to the remote computer, step 516, or assuming that there is no message for the remote computer, step 514, the routine 500 then executes the step 518 of making a determination as to whether or not the dispositive data listing includes a message for the local terminal. Assuming a message for the local terminal 518, the message is printed 520 by the local terminal printer. The message 520 may include, for example, instructions to the operator at the local terminal to telephone a particular individual to let the person know that the return coded stationery item has been received. Assuming instructions from the aforesaid person to retrieve the coded stationery item, the local terminal operator may call-up the dispositive data listing for display, determine the sortation location to which the stationery item was sorted as hereinafter discussed, and retrieve the stationery item for discussion purposes. Assuming the local terminal printer has printed the message 520, or assuming that there is no message in the dispositive data listing for the local terminal 518, the routine then executes the step of sorting the stationery item to the sort location noted in the dispositive data listing, step 522. Whereupon the local routine causes a command executed message to be transmitted, step 368, to the sorting module, followed by causing processing to be returned to idle 306.

At this juncture, as shown in FIG. 2, it will be assumed that both coded and uncoded stationery items are disposed in the sortation locations 142 of the sorting module 130. The next step in processing is to manually deliver the sorted stationery items to their respective destinations, where they are manually opened to extract their contents, or deliver the documents to the optional letter opening module 160. Assuming delivery to the letter opening module 160, since the module 160 is controlled by the local computer reference is again made to FIG. 4(*d*)

As shown in FIG. 4(*d*), assuming the use of a letter opening module, upon receipt of the appropriate request or command the letter opening module is called up, step 530, and the routine 530 causes a determination to be made as to whether or not a stationery has been received, step 532. Assuming that it has not, step 532, the routine 530 causes processing to be returned to idle 306. Assuming, however, that a determination is made that a stationery item has been received 532, the routine implements the steps of causing the mail to be opened, step 532, followed by causing extraction of the contents of the mail, step 536, and, thereafter, the successive steps causing the envelope to be discarded, step 538, and envelope contents to be stacked, 540, and transmitting a message to the letter opening module 368 indicating that the request or command has been executed, followed by causing processing to idle 306.

As shown in FIG. 2, at this juncture, the discarded envelopes 172 at the letter opening module 160 may be disposed of manually. In addition, the contents of the opened mailpieces may be retrieved from the stacker 174, for separating coded stationery items from the remainder of the contents. Whereupon the coded stationery items may be hand delivered to the sorting module 130 for processing as hereinbefore discussed in connection with the sortation of mailpieces 120.

Figure 5:
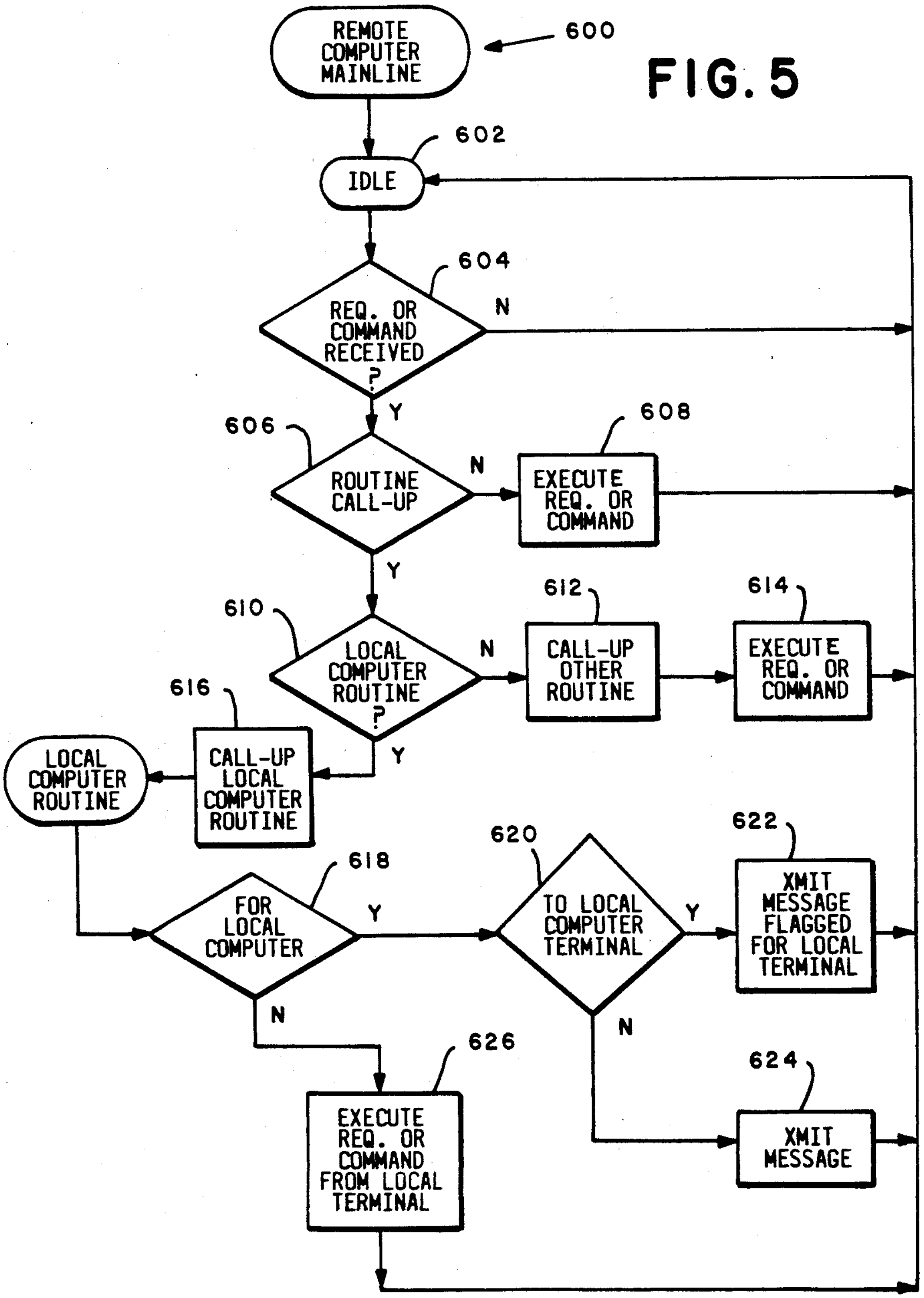
FIG. 5 is a flow chart showing the processing steps implemented by the remote computer of FIG. 2(*b*) for interfacing with the local computer of FIG. 2(*a*).

As shown in FIG. 5, it is assumed that the remote computer is on line and includes a main line program 600 having an idle loop from which requests or commands from and to numerous routines, including a routine concerning the local computer, are serviced. The main line program 600 thus continuously loops from idle 602 to the step of making a determination as to whether or not a request or command has been received, step 604, and back to idle 602 until a request or command is received 604. Upon receiving a request or command, step 604, a determination is then made as to whether or not a routine is to be called up, step 606. If a routine need not be called up, the program 600 causes the request or command is executed, step 608 and followed by causing processing to be returned to idle 602. Assuming a routine is called up, step 606, a determination is then made as to whether or not the local computer is involved, step 610. If the local computer is not involved 610, the other routine which is involved is called up, step 612, followed by the step of causing the request or command concerning the other routine to be executed, step 614, whereupon processing is caused to be returned to idle 602. On the other hand, assuming the request or command is concerned with the local computer, i.e., a message either to or from the local computer, then, the local computer routine is called up 616, followed by a determination being made as to whether or not the request or command is for execution by the local computer, step 618. Assuming it is for execution by the local computer, step 618, a determination is then made as to whether or not it is a message for the local terminal, step 620, and, assuming that it is, the request or command message, flagged for the local terminal, is transmitted to the local computer, step 622, followed by processing being returned to idle 602. Assuming that the message to be executed by the local computer is not for the local terminal 620, then a message which is not flagged for the local terminal is transmitted to the local computer, step 624. If the request or command is not executed by the local computer 618, then, the message is from the local computer. Accordingly, if the message is not for the local computer 618, the request or command from the local computer is executed step 626, followed by processing being returned to idle 602. In the above processing steps processing priority is given to messages sent from the remote computer over those that are received from the local computer.

In accordance with the objects of the invention there has been disclosed an interactive outgoing and incoming letter processing system that is particularly suitable for processing return coded stationery on the basis of criteria established at any time after the stationery items are coded for return purposes, and thus while the mailpieces are in the course of being prepared for sending as well as at any time thereafter and before actually being processed. In addition, there has been provided a system that permits other matters than sorting of such documents to be attended to in the course of preparation and processing of outgoing and incoming stationery items.

What is claimed is:

1. An interactive outgoing and incoming mailpiece processing system comprising:

a. means for processing an outgoing mailpiece for mailing to an addressee, said outgoing mailpiece including a returnable stationery item bearing an identification code identifying the addressee thereof;

b. computer means, said computer means including means for storing said identification code, said computer means including a dispositive data listing for said identification code, said listing including data corresponding to an operation to be implemented by said system, said computer means including means for causing said system to implement said operation upon sensing the identification code for said listing;

c. means for processing an incoming mailpiece, said incoming mailpiece including said stationery item when returned;

d. means for sensing said code; and e. means for changing the dispositive data listing whereby said data corresponding to said operation may be changed.

2. The system according to claim 1, wherein said stationery item is an envelope.

3. The system according to claim 1, wherein said stationery item is a remittance slip.

4. The system according to claim 1, wherein said code is a bar code.

5. The system according to claim 2, wherein said outgoing mailpiece processing means includes means for printing a bar code on said envelope, and said computer means including means for controlling said printing means.

6. The system according to claim 2, wherein said outgoing mailpiece processing means includes means for printing a permit mail serial number on said envelope, and said computer means including means for controlling said printing means.

7. The system according to claim 2, wherein said outgoing mailpiece processing means includes means for printing said code on said envelope, and said computer means including means for controlling said printing means.

8. The system according to claim 1, wherein said outgoing mailpiece processing means includes means for inserting said stationery item into an envelope, and said computer means including means for controlling said inserting means.

9. The system according to claim 7, wherein said outgoing mailpiece processing means includes means for printing postage on said envelope, and said computer means including means for controlling said postage printing means.

10. The system according to claim 7, wherein said outgoing mailpiece processing means includes postage metering means, said postage metering means including said postage printing means, said computer means including means for controlling said postage metering means, and said postage metering control means including said postage printing control means.

11. The system according to claim 1, wherein said computer means includes, a terminal, said terminal including a printer, said operation to be implemented including printing a message, and said causing means including means for causing said printer to print said message when said code is sensed.

12. The system according to claim 1, wherein said computer means includes a terminal, said terminal including an operator controlled keyboard, and said changing means including said keyboard.

13. The system acccording to claim 1, wherein said operation to be implemented includes transmitting a message, and said causing means including means for transmitting said message to an external device when said code is sensed.

14. The system according to claim 1 including a remote computer, said remote computer coupled to said computer means, said remote computer including a printer, said operation to be implemented including printing a message, said causing means including means for causing said message to be transmitted to said remote computer when said code is sensed, and said causing means including means for causing said transmitted message to be printed by said printer.

15. The apparatus according to claim 1 including a remote computer coupled to said computer means, and said remote computer including said changing means.

16. The apparatus according to claim 1 including a remote computer, said remote computer including means for storing data corresponding to said dispositive data listing, said remote computer coupled to said computer means, said remote computer including an operator controlled keyboard, and said changing means including said keyboard.

17. The apparatus according to claim 1, wherein said computer means includes means for storing data corresponding to said code, said dispositive data listing associated with said stored code data, said sensing means including means for providing a signal corresponding to said sensed code, said computer means including means for providing data corresponding said code signals, said computer means including means for comparing said sensed code data and stored code data, and said causing means including means for causing said operation to be implemented if said sensed and stored code data compare to each other.

18. The system according to claim 1, wherein said computer means is located in a mailroom environment.

19. The system according to claim 5, wherein said bar code is a postal bar code.

20. The system according to claim 1, wherein said dispositive data listing includes data corresponding to an address, said operation to be implemented including printing said address, said outqoing mail processing means including means for printing said address on said stationary item, and said causing means including means for causing said printing means to print said address when said code is sensed.

21. The system according to claim 1, wherein said outgoing mailpiece processing means includes printing means and mailpiece feeding means, said feeding means including means for normally feeding said stationery item in a first feed path to said printing means, said feeding means including means for selectively feeding said stationery item in a second feed path out of said first feed path, said operation to be implemented selectively including data defining said second feed path as the path in which said stationery item is to be fed, and said causing means including means for causing said feeding means to feed said stationery item in said second feed path when said code thereof is sensed and said dispositive data listing includes said data defining said second feed path.

22. The system according to claim 1, wherein said incoming mailpiece processing means includes means for routing said stationery item when returned to a selected one of a plurality of locations, said computer means coupled to said routing means, said computer means including means for controlling said routing means, said operation to be implemented including routing said stationery item to one of said locations, and said causing means including means for causing said routing means to route said returned stationery item to said selected location when said code is sensed.

* * * * *